US012574234B2

(12) United States Patent
Bukov et al.

(10) Patent No.: US 12,574,234 B2
(45) Date of Patent: Mar. 10, 2026

(54) SECURE CROSS-CHAIN ATOMIC SWAPS

(71) Applicant: Degensoft Ltd., Dubai (AE)

(72) Inventors: Anton Bukov, Dubai (AE); Sergej Kunz, Dubai (AE)

(73) Assignee: Degensoft Ltd, Dubai (AE)

( * ) Notice: Subject to any disclaimer, the term of this patent is extended or adjusted under 35 U.S.C. 154(b) by 0 days.

(21) Appl. No.: 19/181,802

(22) Filed: Apr. 17, 2025

(65) Prior Publication Data

US 2025/0358109 A1 Nov. 20, 2025

Related U.S. Application Data

(60) Provisional application No. 63/636,006, filed on Apr. 18, 2024.

(51) Int. Cl.
*H04L 9/08* (2006.01)
*H04L 9/32* (2006.01)

(52) U.S. Cl.
CPC .......... *H04L 9/0894* (2013.01); *H04L 9/0869* (2013.01); *H04L 9/3213* (2013.01)

(58) Field of Classification Search
CPC ... H04L 63/1441; H04L 51/046; H04L 51/12; H04L 63/0254; H04L 63/0281; H04L 63/1433; H04L 63/20; H04L 63/1425; H04L 63/08; H04L 63/101; H04L 63/105; H04L 63/145; H04L 12/4625; H04L 2463/144; H04L 63/0236; H04L 9/30; H04L 9/088; H04L 9/0618; H04L 9/0869; G06F 21/6245; G06F 16/9535; G06F 21/45; G06F 21/552; G06F 21/577; G06F 21/604; G06F 21/64; G06F 2221/2129; H04W 12/02; H04W 12/03; H04W 12/04; H04W 12/08; H04W 12/71; H04W 84/12
(Continued)

(56) References Cited

U.S. PATENT DOCUMENTS 6,422,373 B1    7/2002   Yellop et al.
7,204,428 B2 *  4/2007   Wilson ................. G06V 10/245
                                                                235/494
(Continued)

OTHER PUBLICATIONS

Abgaryan et al., "Dynamic Function Market Maker", arxiv.org, Jul. 25, 2023, 41 pages.
(Continued)

*Primary Examiner* — Sharif E Ullah
(74) *Attorney, Agent, or Firm* — Perkins Coie LLP

(57) ABSTRACT

Systems and methods for a secure cross-chain atomic swaps are disclosed herein. A user submits to a swap platform a signed limit order to atomically swap an amount of input token for an output token. The swap may involve a Dutch auction approach, in which the order execution price depends on time of inclusion in a block and decreases over the duration of the Dutch auction. The swap platform provides the order details to whitelisted resolvers to evaluate if/when/how to fill the order. Once a resolver makes that determination, it can utilize smart contracts associated with the swap platform to perform the atomic swap on behalf of the user and itself (e.g., without active involvement of the user). Input tokens deposited on an escrow contract are unlocked at the same time that output tokens deposited on another escrow contract are unlocked.

20 Claims, 4 Drawing Sheets

(58) Field of Classification Search
USPC ........ 713/193, 150, 163, 181; 726/2, 21, 36;
380/255, 264, 276
See application file for complete search history.

(56) References Cited

U.S. PATENT DOCUMENTS

| | | | | |
|---|---|---|---|---|
| 7,537,877 | B2* | 5/2009 | Yoshiba | G03G 9/0812 |
| | | | | 430/108.7 |
| 7,773,749 | B1* | 8/2010 | Durst | G06K 19/086 |
| | | | | 380/54 |
| 8,851,372 | B2* | 10/2014 | Zhou | H04B 1/385 |
| | | | | 455/66.1 |
| 9,239,414 | B2* | 1/2016 | Rey | B44C 1/04 |
| 9,269,576 | B2* | 2/2016 | Yamauchi | H01L 21/02529 |
| 10,281,398 | B2* | 5/2019 | Zheng | G01N 21/553 |
| 10,412,107 | B2* | 9/2019 | Brutzkus | H04L 63/1425 |
| 10,471,478 | B2* | 11/2019 | Gil | B07C 3/14 |
| 10,603,685 | B2* | 3/2020 | Zheng | C23C 26/00 |
| 10,620,121 | B2* | 4/2020 | Zheng | G01N 15/14 |
| 10,878,108 | B1* | 12/2020 | Nicolas | G06F 21/602 |
| 11,123,456 | B2 | 9/2021 | Masinaei et al. | |
| 11,234,567 | B2 | 2/2022 | Thorne et al. | |
| 11,310,060 | B1* | 4/2022 | Poelstra | H04L 9/3066 |
| 11,456,789 | B2 | 9/2022 | Hou et al. | |
| 11,484,011 | B2* | 11/2022 | Chapman | A01K 27/006 |
| 11,488,122 | B2* | 11/2022 | Diamond | G06Q 20/10 |
| 11,544,786 | B2 | 1/2023 | Diamond | |
| 11,567,890 | B2 | 1/2023 | Bussing et al. | |
| 11,678,901 | B2 | 6/2023 | Scoggins et al. | |
| 11,789,012 | B2 | 10/2023 | Janes et al. | |
| 11,890,123 | B2 | 2/2024 | Boone et al. | |
| 12,099,978 | B2 | 9/2024 | Bukov et al. | |
| 12,277,536 | B2 | 4/2025 | Dominique et al. | |
| 12,423,697 | B1 | 9/2025 | Kunz et al. | |
| 2003/0120613 | A1* | 6/2003 | Neogi | G06Q 20/401 |
| | | | | 705/75 |
| 2003/0200439 | A1 | 10/2003 | Moskowitz | |
| 2004/0112087 | A1* | 6/2004 | Bishop | G09F 3/00 |
| | | | | 63/32 |
| 2008/0264043 | A1 | 10/2008 | Kawakita et al. | |
| 2010/0018955 | A1* | 1/2010 | Martinez | G11B 7/1378 |
| | | | | 219/121.68 |
| 2010/0235277 | A1 | 9/2010 | Van et al. | |
| 2010/0310839 | A1* | 12/2010 | Rey | B44C 1/04 |
| | | | | 216/33 |
| 2012/0120465 | A1* | 5/2012 | Martinez | G03H 1/08 |
| | | | | 219/121.2 |
| 2012/0167210 | A1* | 6/2012 | Oro Garcia | H04L 63/101 |
| | | | | 726/22 |
| 2013/0117225 | A1* | 5/2013 | Dalton | G06F 16/119 |
| | | | | 707/623 |
| 2013/0157711 | A1 | 6/2013 | Lee et al. | |
| 2014/0040114 | A1 | 2/2014 | Baumgart et al. | |
| 2014/0289163 | A1 | 9/2014 | Michaud et al. | |
| 2015/0213734 | A1* | 7/2015 | Glickman | G09F 3/005 |
| | | | | 235/494 |
| 2016/0099852 | A1* | 4/2016 | Cook | H04L 47/2425 |
| | | | | 709/224 |
| 2016/0275585 | A1* | 9/2016 | Scoggins | G06Q 30/0621 |
| 2016/0300234 | A1* | 10/2016 | Moss-Pultz | H04L 9/3247 |
| 2018/0109494 | A1* | 4/2018 | Yu | H04L 63/1441 |
| 2018/0293474 | A1* | 10/2018 | Almog | G09C 5/00 |
| 2018/0349621 | A1* | 12/2018 | Schvey | H04L 9/3236 |
| 2018/0352033 | A1 | 12/2018 | Pacella et al. | |
| 2019/0114698 | A1* | 4/2019 | Lutnick | G06Q 30/0601 |
| 2019/0130100 | A1* | 5/2019 | Dymshits | G06F 16/90335 |
| 2019/0173666 | A1* | 6/2019 | Ardashev | H04L 9/3239 |
| 2019/0349261 | A1 | 11/2019 | Smith et al. | |
| 2019/0349733 | A1* | 11/2019 | Nolan | H04L 45/20 |
| 2019/0355037 | A1* | 11/2019 | Desai | G06F 16/955 |
| 2019/0373521 | A1 | 12/2019 | Crawford | |
| 2019/0378145 | A1* | 12/2019 | Mayer | G06F 40/40 |
| 2019/0379595 | A1 | 12/2019 | Ur et al. | |
| 2019/0385156 | A1 | 12/2019 | Liu | |
| 2019/0392511 | A1 | 12/2019 | Mahajan et al. | |
| 2020/0076786 | A1* | 3/2020 | Spivack | B42D 25/328 |
| 2020/0082025 | A1 | 3/2020 | Zhou et al. | |
| 2020/0104835 | A1 | 4/2020 | Day et al. | |
| 2020/0119925 | A1 | 4/2020 | Wang | |
| 2020/0137082 | A1* | 4/2020 | Jimenez-Delgado | |
| | | | | H04L 9/0643 |
| 2020/0145454 | A1* | 5/2020 | Galliano | H04L 61/4511 |
| 2020/0204346 | A1* | 6/2020 | Trevethan | H04L 9/3271 |
| 2020/0246681 | A1* | 8/2020 | Chen | G06K 7/1408 |
| 2020/0403776 | A1* | 12/2020 | Oh | H04L 9/3247 |
| 2021/0027447 | A1* | 1/2021 | Parikh | G06F 18/22 |
| 2021/0035246 | A1 | 2/2021 | Schouppe et al. | |
| 2021/0073913 | A1 | 3/2021 | Ingargiola | |
| 2021/0091934 | A1* | 3/2021 | Fletcher | H04L 9/0847 |
| 2021/0160235 | A1* | 5/2021 | Lerner | H04L 9/0866 |
| 2021/0287288 | A1* | 9/2021 | Madisetti | H04L 9/14 |
| 2021/0352142 | A1 | 11/2021 | Jayaram et al. | |
| 2021/0358004 | A1* | 11/2021 | Chang | G06Q 30/0621 |
| 2021/0390531 | A1* | 12/2021 | Voorhees | G06Q 20/367 |
| 2022/0027970 | A1* | 1/2022 | Kim | G06Q 30/0613 |
| 2022/0126438 | A1 | 4/2022 | Cristache | |
| 2022/0134547 | A1 | 5/2022 | Cristache | |
| 2022/0174491 | A1 | 6/2022 | Cristache | |
| 2022/0254174 | A1* | 8/2022 | Hong | G06V 10/758 |
| 2022/0266451 | A1 | 8/2022 | Cristache | |
| 2022/0311597 | A1* | 9/2022 | Goel | H04L 9/14 |
| 2022/0341217 | A1 | 10/2022 | Cristache | |
| 2023/0016065 | A1* | 1/2023 | Diamond | G06Q 30/06 |
| 2023/0077053 | A1* | 3/2023 | Topps | H04L 9/0825 |
| 2023/0086191 | A1* | 3/2023 | Jakobsson | H04L 9/3231 |
| | | | | 705/66 |
| 2023/0198886 | A1 | 6/2023 | Ur et al. | |
| 2023/0206329 | A1 | 6/2023 | Cella et al. | |
| 2023/0267456 | A1 | 8/2023 | Garner et al. | |
| 2023/0385822 | A1 | 11/2023 | Shanmugam et al. | |
| 2024/0089105 | A1* | 3/2024 | Duque | H04L 9/0825 |
| 2024/0129108 | A1* | 4/2024 | Liu | H04L 9/0618 |
| 2024/0193688 | A1 | 6/2024 | Nowotny et al. | |
| 2024/0273486 | A1 | 8/2024 | Bukov et al. | |
| 2024/0273487 | A1 | 8/2024 | Bukov et al. | |
| 2024/0340354 | A1* | 10/2024 | Wakabayashi | H04L 67/12 |
| 2024/0420227 | A1* | 12/2024 | Bukov | G06Q 20/381 |
| 2024/0428209 | A1 | 12/2024 | Bukov et al. | |
| 2025/0165937 | A1 | 5/2025 | Bukov et al. | |
| 2025/0211297 | A1* | 6/2025 | Gao | H04B 7/0486 |
| 2025/0212284 | A1* | 6/2025 | Yue | H04W 40/34 |
| 2025/0292252 | A1 | 9/2025 | Kunz et al. | |
| 2025/0292254 | A1 | 9/2025 | Kunz et al. | |

OTHER PUBLICATIONS

Anonymous: "1inch.io", Jan. 4, 2023, XP093135078, Retrieved from the Internet on Feb. 26, 2024: URL:http://1inch.io.

Belchior et al., "A Survey on Blockchain Interoperability: Past, Present, and Future Trends", ACM Computing Surveys, vol. 54, No. 8, 2021, pp. 1-63.

Benligiray et al., "Decentralized APIs for Web 3.0", api3.org, Jan. 9, 2024, pp. 1-40.

Breidenbach et al., "Chainlink 2.0: Next Steps in the Evolution of Decentralized Oracle Networks", Retrieved from the Internet: URL:https://research.chain.link/whitepaper-v2.pdf, Apr. 15, 2021, pp. 1-136.

Celestino; An_attempt_at_introducing_Multipath_in_QUIC; IEEE, Univ of Napoli; pp. 352-357; 2018.

Fang Lucius et al.: "How to DEFI (Advanced)", May 31, 2021, pp. 1-290, XP055960691, ISBN: 9798530318443, Retrieved from the Internet on Feb. 27, 2024: URL:https://cp0x.com/applications/core/interface/file/attachment.php?id=1653&key=fca3e1489485ef25c33f83d8636fd16b.

File History and the references cited therein of corresponding U.S. Appl. No. 18/597,680, filed Mar. 6, 2024, issued Sep. 24, 2024 as U.S. Pat. No. 12,099,978 B2.

File History and the references cited therein of corresponding U.S. Appl. No. 18/809,084, filed Aug. 19, 2024, published May 22, 2025 as U.S. Publication No. 2025-0165937 A1.

(56)        References Cited

OTHER PUBLICATIONS

File History and the references cited therein of corresponding U.S. Appl. No. 19/079,026, filed Mar. 13, 2025.
File History and the references cited therein of corresponding U.S. Appl. No. 19/086,741, filed Mar. 21, 2025.
File History of corresponding U.S. Appl. No. 63/484,317, filed Feb. 10, 2023.
File History of corresponding U.S. Appl. No. 63/566,109, filed Mar. 15, 2024.
Gabriel; No_Plan_Survives_Contact_with_the_Enemy_On_Gains_of_Coded_Multipath_over_MPTCP; IEEE; 8 pages; 2021.
International search Report and written opinion received for PCT application No. PCT/IB25/054076, mailed on Aug. 13, 2025, 16 pages.
Lesavre et al., "Blockchain Networks: Token Design and Management Overview", NISTIR 8301, 2021, 84 pages.
Li; Multipath_Transmission_for_the_Internet_A_Survey; IEEE; 2016; pp. 2887-2925.
Nadkarni et al., "Adaptive Curves for Optimally Efficient Market Making", arxiv.org, Jun. 19, 2024, 25 pages.
Patent Application as filed of U.S. Appl. No. 18/408,376, filed Jan. 9, 2024, 81 pages.
Shi et al., "Integration of Blockchain and Auction Models: A Survey, Some Applications, and Challenges", IEEE Communications Surveys & Tutorials, vol. 25, No. 1, Nov. 28, 2022, 41 pages.
Wu; Peekaboo_Learning-Based_Multipath_Scheduling_for_Dynamic_Heterogeneous_Environments; IEEE; pp. 2995-2310; 2020.
Xu, J. et al., "SoK: Decentralized Exchanges (DEX) with Automated Market Maker (AMM) protocols" Arxiv.Org, Cornell University Library, Apr. 19, 2021, XP081930404.
Xue, Y. et al., "Invited Paper: Fault-tolerant and Expressive Cross-Chain Swaps", arxiv.org, Cornell University Library, Nov. 1, 2022, XP091357638.
Zaman et al., "Seamless Asset Exchange in Interconnected Metaverses: Unraveling On-Chain Atomic Swap", 2023 5th IEEE International Conference on Trust, Privacy and Security in Intelligent Systems and Applications (TPS-ISA), 2023, pp. 146-155.
File History of related U.S. Appl. No. 63/636,006, filed Apr. 18, 2024.

* cited by examiner

400

402

Mass Storage Device
404

Central Processing Unit
(CPU)
406

Multimedia Devices
408

Memory
410

I/O Devices and
Interfaces
412

Module
414

416

Portable Devices
415

Network
418

Computing Systems
420

Data Source
422

SECURE CROSS-CHAIN ATOMIC SWAPS

CROSS-REFERENCE TO RELATED APPLICATIONS

The present application claims the benefit under 35 U.S.C. § 119 (e) of U.S. Provisional Application No. 63/636, 006, filed Apr. 18, 2024, which is hereby incorporated herein by reference in its entirety under 37 C.F.R. § 1.57. Any and all applications for which a foreign or domestic priority claim is identified in the Application Data Sheet as filed with the present application are hereby incorporated by reference under 37 CFR 1.57.

TECHNICAL FIELD

The implementations of the disclosure generally relate to decentralized swaps of cryptocurrency tokens (e.g., peer-to-peer transactions implemented via smart contracts of a distributed blockchain network rather than through a centralized intermediary that takes possession of the tokens). More specifically, the implementations of the disclosure relate to cross-chain atomic swaps of cryptocurrency tokens, which utilize smart contracts and protocols to ensure that the swap is either fully executed or not executed (with no states in-between).

BACKGROUND

Users often perform swaps of blockchain-based cryptocurrency tokens, in which an amount of an input token is exchanged for an amount of an output token. Such swaps can be performed over centralized exchanges or in a decentralized fashion (e.g., on decentralized exchanges). Of the two, decentralized swaps have been gaining in popularity-leading to a rise to decentralized finance (DeFi), an emerging blockchain-based ecosystem of permissionless and transparent financial services. Various approaches have been developed to enable parties to swap tokens across blockchain networks in a decentralized fashion without relying on a centralized intermediary to facilitate the transaction.

Atomic swaps are a class of such techniques that enable two parties to swap tokens across different blockchain networks while retaining total control over their tokens. The term atomic derives from the term "atomic state" in which a state has no substates; either the entire event happens or nothing happens—there is no other alternative. This refers to the state of the swap; it either fully happens (and the two parties exchange their tokens) or it does not, and an outcome in which half the swap occurs (e.g., one of the parties ends up with both sets of tokens) is not possible.

To achieve this, atomic swaps have typically made use of smart contracts to ensure that both parties agree to the swap before executing the swap for them. More specifically, a particular type of smart contract called Hash Timelock Contract (HTLC) can be used to automate the exchange of tokens. A HTLC is a time-bound smart contract between parties that involves generating one cryptographic hash on each end. The use of HTLCs requires both parties to acknowledge receipt of funds within a specified timeframe. If one party fails to confirm the transaction within the timeframe, then the entire transaction is voided, and funds are returned.

However, atomic swaps are not without their limitations. For example, the classic atomic swap relies on complex interactions from both parties to perform the swap. Although special wallets or exchange services may be used to help conduct the atomic swap and streamline atomic swaps for non-expert users, such wallets or services often have poor UX, lack flexibility in varying how the atomic swap is performed, and may raise security concerns. Many such wallets or services are also limited to use with the classic atomic swap, despite new atomic swap techniques still being developed and refined. Accordingly, there exists a need for a swap platform and/or swap approach that allows users to perform atomic swaps in an easier, more streamlined, and more efficient manner (e.g., without active involvement of the user desiring to perform the swap).

SUMMARY

For purposes of this summary, certain aspects, advantages, and novel features are described herein. It is to be understood that not necessarily all such advantages may be achieved in accordance with any particular embodiment. Thus, for example, those skilled in the art will recognize the disclosures herein may be embodied or carried out in a manner that achieves one or more advantages taught herein without necessarily achieving other advantages as may be taught or suggested herein.

All of the implementations described herein are intended to be within the scope of the present disclosure. These and other implementations will be readily apparent to those skilled in the art from the following detailed description, having reference to the attached figures. The invention is not intended to be limited to any particular disclosed embodiment or implementations.

Systems and methods for a secure cross-chain atomic swaps are disclosed herein. A user submits to a swap platform a signed limit order to atomically swap an amount of input token for an output token. The swap may involve a Dutch auction approach, in which the order execution price depends on time of inclusion in a block on the blockchain and decreases over the duration of the Dutch auction. The swap platform provides the order details to whitelisted resolvers to evaluate if/when/how to fill the order. Once a resolver makes that determination, it can utilize smart contracts associated with the swap platform to perform the atomic swap on behalf of the user and itself (e.g., without active involvement of the user). Input tokens deposited on an escrow contract are unlocked at the same time that output tokens deposited on another escrow contract are unlocked.

Some implementations herein are directed to a system for cross-chain atomic swaps, the system comprising: a swap platform comprising a relayer service in communication with: a first distributed blockchain network comprising a peer-to-peer (P2P) computer network of N nodes that maintain a first blockchain tracking a first token; a second distributed blockchain network comprising a peer-to-peer (P2P) computer network of M nodes that maintain a second blockchain tracking a second token; a plurality of resolvers; a decentralized application operating on at least one user device; and a plurality of decentralized exchanges and/or centralized exchanges; at least one hardware processor; and at least one non-transitory memory storing instructions, which, when executed by the at least one hardware processor, cause the swap platform to: receive, from the decentralized application operating on the at least one user device, an atomic cross-chain swap request comprising a request to exchange a first amount of the first token for a second amount of the second token; receive, from the decentralized application operating on the at least one user device, an encrypted secret and a secret hash, wherein the encrypted secret comprises a cryptographically secure random value secured by the secret hash; generate, by the swap platform, a smart contract comprising a token approval function configured to verify, via the decentralized application, user approval of the atomic cross-chain swap request; broadcast, by the relayer service of the swap platform, the atomic cross-chain swap request to the plurality of resolvers; receive, from a resolver of the plurality of resolvers, an indication of the resolver to process the atomic cross-chain swap request; verify, by the relayer service, the first amount of the first token stored in a first location and second amount of the second token stored in a second location; and transmit, by the relayer service to the resolver, the encrypted secret and the secret hash.

In some implementations, the atomic cross-chain swap request comprises at least one of the following request parameters: the first token, the amount of the first token, the second token, the amount of second token, a minimum amount of the second token, and a time threshold. In some implementations, the atomic cross-chain swap request comprises at least one of the following request parameters: swap rate and execution approach. In some implementations, the smart contract comprises a token approval function. In some implementations, the resolver comprises more than one resolver of the plurality of resolvers. In some implementations, the secret is separately encrypted for each of the more than one resolver. In some implementations, the secret comprises a plurality of secrets, each secret corresponding to one of each of the plurality of resolvers. In some implementations, the secret is generated using a cryptographic random number generator.

Some implementations herein are directed to a computer-implemented method for cross-chain atomic swaps, the computer-implemented method comprising: receiving, by a computing device from a decentralized application operating on at least one user device, an atomic cross-chain swap request comprising a request to exchange a first amount of a first token for a second amount of a second token, wherein the first token is tracked by a first blockchain maintained by a first distributed blockchain network comprising a peer-to-peer (P2P) computer network of N nodes, and wherein the second token is tracked by a second blockchain maintained by a second distributed blockchain network comprising a peer-to-peer (P2P) computer network of M nodes; receiving, by the computing device from the decentralized application operating on the at least one user device, an encrypted secret and a secret hash, wherein the encrypted secret comprises a cryptographically secure random value secured by the secret hash; generating, by the computing device, a smart contract comprising a token approval function configured to verify, via the decentralized application, user approval of the atomic cross-chain swap request; broadcasting, by the computing device, the atomic cross-chain swap request to a plurality of resolvers; receiving, by the computing device from a resolver of the plurality of resolvers, an indication of the resolver to process the atomic cross-chain swap request; verifying, by the computing device, the first amount of the first token stored in a first location and second amount of the second token stored in a second location; and transmitting, by the computing system to the resolver, the encrypted secret and the secret hash, wherein the computing system comprises a processor and a memory.

In some implementations, the atomic cross-chain swap request comprises at least one of the following request parameters: the first token, the amount of the first token, the second token, the amount of second token, a minimum amount of the second token, and a time threshold. In some implementations, the atomic cross-chain swap request comprises at least one of the following request parameters: swap rate and execution approach. In some implementations, the smart contract comprises a token approval function. In some implementations, the resolver comprises more than one resolver of the plurality of resolvers. In some implementations, the secret is separately encrypted for each of the more than one resolver. In some implementations, the secret comprises a plurality of secrets, each secret corresponding to one of each of the plurality of resolvers. In some implementations, the secret is generated using a cryptographic random number generator.

Some implementations herein are directed to a non-transitory computer readable medium having stored thereon instructions for causing a processing circuitry to execute a process, the process comprising: receiving, from a decentralized application operating on at least one user device, an atomic cross-chain swap request comprising a request to exchange a first amount of a first token for a second amount of a second token, wherein the first token is tracked by a first blockchain maintained by a first distributed blockchain network comprising a peer-to-peer (P2P) computer network of N nodes, and wherein the second token is tracked by a second blockchain maintained by a second distributed blockchain network comprising a peer-to-peer (P2P) computer network of M nodes; receiving, from the decentralized application operating on the at least one user device, an encrypted secret and a secret hash, wherein the encrypted secret comprises a cryptographically secure random value secured by the secret hash; generating a smart contract comprising a token approval function configured to verify, via the decentralized application, user approval of the atomic cross-chain swap request; broadcasting the atomic cross-chain swap request to a plurality of resolvers; receiving, from a resolver of the plurality of resolvers, an indication of the resolver to process the atomic cross-chain swap request; verifying the first amount of the first token stored in a first location and second amount of the second token stored in a second location; and transmitting, to the resolver, the encrypted secret and the secret hash.

In some implementations, the atomic cross-chain swap request comprises at least one of the following request parameters: the first token, the amount of the first token, the second token, the amount of second token, a minimum amount of the second token, and a time threshold. In some implementations, the atomic cross-chain swap request comprises at least one of the following request parameters: swap rate and execution approach. In some implementations, the smart contract comprises a token approval function.

BRIEF DESCRIPTION OF THE DRAWINGS

These and other features, aspects, and advantages of the disclosure are described with reference to drawings of certain implementations, which are intended to illustrate, but not to limit, the present disclosure. It is to be understood that the accompanying drawings, which are incorporated in and constitute a part of this specification, are for the purpose of illustrating concepts disclosed herein and may not be to scale.

Figure 1:
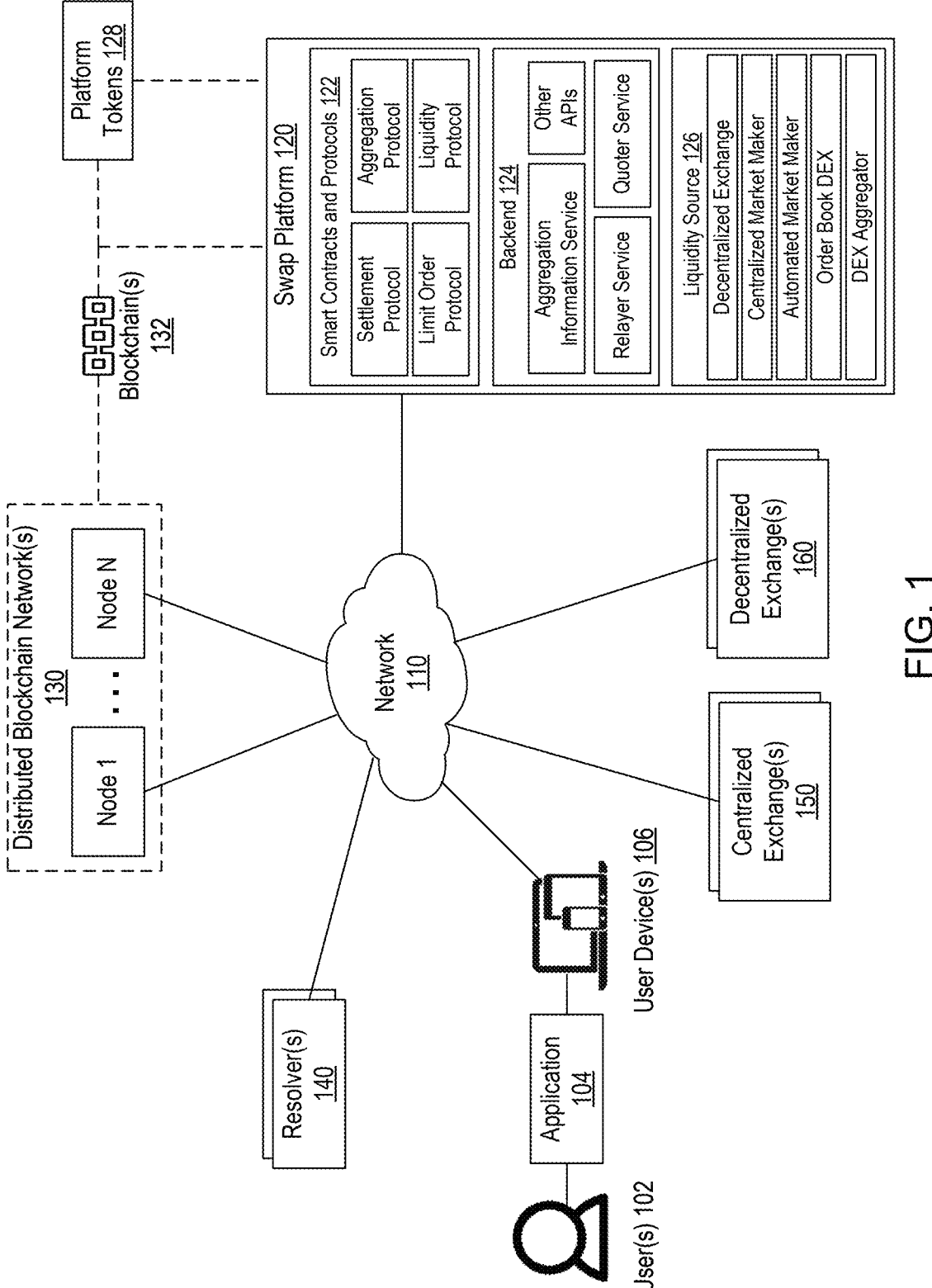
FIG. 1 illustrates a system diagram comprising a swap platform that can be used to implement secure cross-chain atomic swaps, in accordance with implementations disclosed herein.

The technologies described herein will become more apparent to those skilled in the art from studying the Detailed Description in conjunction with the drawings. Implementations or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Although several implementations, examples, and illustrations are disclosed below, it will be understood by those of ordinary skill in the art that the inventions described herein extend beyond the specifically disclosed implementations, examples, and illustrations and includes other uses of the inventions and obvious modifications and equivalents thereof. Implementations of the inventions are described with reference to the accompanying figures, wherein like numerals refer to like elements throughout. The terminology used in the description presented herein is not intended to be interpreted in any limited or restrictive manner simply because it is being used in conjunction with a detailed description of certain specific implementations of the inventions. In addition, implementations of the inventions can comprise several novel features and no single feature is solely responsible for its desirable attributes or is essential to practicing the inventions herein described.

This application is best understood with the context provided by the discussion of swap platforms capable of performing swaps using smart contracts/protocols, as described in U.S. application Ser. No. 18/408,376, filed on Jan. 9, 2024 and entitled "GASLESS DECENTRALIZED TOKEN SWAPS," the contents of which are hereby incorporated by reference in its entirety.

The terms "users," "makers," and "swappers," are used synonymously herein to refer to any person that utilizes a swap platform by submitting a token swap order to the swap platform.

The terms "resolvers," "takers," "fillers," and "market makers" are used synonymously herein to refer to a third party or entity that fills swap orders submitted by users (e.g., as a counterparty) via the swap platform or it may refer to the collection of applications employed by such a third party or entity. Examples of such entities may include MEV searchers, market makers, on-chain agents, and so forth, who collectively compete to fill orders submitted by users. In the latter sense, the term "resolver" could also be used to refer to a set of on-chain and off-chain applications, which are components in an architecture that is developed by a third party or entity for use with a swap platform to fill swap orders.

The terms "input token," "source token," and "maker token" are used synonymously to refer to the type of token that is in a user's wallet, which the user is seeking to exchange for a different type of token via a token swap order submitted to the swap platform.

The terms "output token," "destination token," and "taker token" are used synonymously to refer to the type of token that the user is seeking to exchange for via a token swap order submitted to the swap platform. The output token may be transferred from a resolver to the user's wallet.

As used herein, the term "limit order" may refer to a Dutch auction limit order with a dynamic limit price that is implemented on the settlement contract instead of a limit order as understood in classical finance. The execution price of such a limit order may decrease over a duration of a Dutch auction.

In some implementations, a system for performing cross-chain atomic swaps may implement a distributed computing architecture that enables secure and efficient data synchronization across heterogeneous blockchain networks. In some implementations, the system may utilize advanced cryptographic primitives and consensus algorithms to establish verifiable cross-chain state transitions without relying on centralized intermediaries. In some implementations, the swap platform may employ a specialized distributed ledger technology that extends traditional blockchain structures to support multi-chain operations. This may involve implementing a layered protocol stack that includes a base layer for individual chain consensus, an interoperability layer for cross-chain communication, and an application layer for executing complex multi-chain logic.

In some implementations, the system may utilize zero-knowledge proof systems to enable privacy-preserving verification of cross-chain transactions. These cryptographic constructs may allow the platform to validate the correctness of operations across different networks without revealing sensitive transaction data. The implementation may leverage succinct non-interactive arguments of knowledge (SNARKs) or scalable transparent arguments of knowledge (STARKs) to generate compact proofs that can be efficiently verified on-chain.

In some implementations, a resolver component may implement a distributed hash table (DHT) architecture to efficiently route and execute cross-chain operations. This decentralized lookup system may enable resolvers to quickly locate and access relevant blockchain data across multiple networks. The DHT may be augmented with a protocol to propagate real-time network state updates among resolver nodes.

In some implementations, the system may comprise a consensus mechanism specifically designed for cross-chain coordination. This may involve implementing a Byzantine fault-tolerant protocol that achieves agreement on the global state across multiple blockchain networks. The consensus algorithm may utilize a combination of proof-of-stake and threshold signatures to ensure security and scalability in a multi-chain environment. The swap platform may also employ advanced data structures, such as Merkle trees and vector commitments, to efficiently represent and verify cross-chain state. These cryptographic accumulators may enable compact proofs of inclusion for individual chain states within a global multi-chain state. The system may leverage these structures to implement efficient state synchronization and validation protocols across heterogeneous blockchain networks.

In some implementations, the system may utilize formal verification techniques to ensure the correctness and security of critical smart contract components. This may involve developing mathematical models of the contract behavior and using automated theorem provers to verify key safety and liveness properties. The formal verification process may help identify and mitigate potential vulnerabilities in the cross-chain interaction logic. In some implementations, the platform may implement a novel sharding scheme that allows for parallel processing of cross-chain operations. This may involve partitioning the global state and computation across multiple shards, with each shard responsible for a subset of supported blockchain networks. The sharding architecture may utilize a distributed hash-based load balancing algorithm to evenly distribute cross-chain transactions across available computational resources.

In some implementations, the system may incorporate a decentralized oracle network to provide secure and reliable external data feeds to the cross-chain swap contracts. This oracle system may utilize a combination of hardware-based trusted execution environments (TEEs) and cryptographic commitment schemes to ensure the integrity and freshness of off-chain data used in swap execution. In some implementations, the swap platform may employ advanced network layer optimizations to minimize latency and improve throughput in cross-chain communications. This may involve implementing custom routing protocols and network coding techniques to efficiently propagate transaction data across geographically distributed nodes. The system may also utilize adaptive congestion control algorithms to optimize data flow across heterogeneous blockchain networks with varying performance characteristics.

In some implementations, the system for performing cross-chain atomic swaps may provide significant improvements to computer functionality and blockchain technology. The system implements a technical solution that addresses the challenges of securely exchanging digital assets across disparate blockchain networks. In some implementations, the system's core functionality includes specialized smart contracts, cryptographic protocols, and distributed computing techniques to enable complex cross-chain operations. Furthermore, the implementation of zero-knowledge proofs, distributed hash tables, and custom consensus mechanisms represents concrete applications of advanced computer science and cryptography principles. In some implementations, the system provides a technical improvement to blockchain interoperability by implementing a layered protocol stack and novel data structures specifically designed for multi-chain operations. This architecture enables efficient cross-chain state synchronization and verification, addressing technical limitations of existing blockchain systems.

Furthermore, the implementation of a sharding scheme for parallel processing of cross-chain operations may significantly enhance the scalability and performance of blockchain networks. This technical solution goes beyond merely applying the concept of asset exchange to a computer environment, instead fundamentally improving the underlying blockchain technology itself. Formal verification techniques to ensure smart contract correctness represents a concrete technological step to enhance the security and reliability of cross-chain interactions. This methodology directly addresses critical challenges in blockchain security.

By incorporating a decentralized oracle network with trusted execution environments, the system includes a technical approach to securely integrating external data into blockchain operations, which is a practical application that enhances the functionality and real-world applicability of cross-chain systems. In some implementations, advanced network layer optimizations and adaptive congestion control algorithms represents concrete technical improvements to the efficiency and performance of distributed blockchain networks. These enhancements provide specific technological solutions to real-world networking challenges in blockchain systems.

In summary, the innovative combination of cryptographic techniques, distributed computing architectures, and blockchain-specific optimizations represents a significant advancement in the technical field of cross-chain interoperability. These improvements extend well beyond conventional blockchain implementations, providing tangible enhancements to computer functionality and addressing specific technological problems in the blockchain domain.

In an example implementation, a party A wishes to perform an atomic swap of some amount of token A (associated with blockchain A) in their possession for some amount of token B (associated with blockchain B) owned by a party B. There are many technical difficulties in coordinating the simultaneous exchange of two different tokens on two different blockchains, but atomic swap implementations using smart contracts have enabled these kinds of exchanges. In a classic implementation of an atomic swap, party A would lock up their token A in an HTLC time-bound smart contract on blockchain A. A private key (e.g., a secret) would be generated that only party A has access to, and a cryptographic hash of the private key is sent to party B.

In some implementations, Party B can use the hash to verify that party A deposited their tokens to the contract address. However, party B will not be able to unlock and obtain the tokens at this step; party B only has the hash, which cannot be used to derive the private key needed to unlock the tokens. Instead, party B can use the hash to generate a new contract address, thereby locking up their token B in an HTLC time-bound smart contract on blockchain B. More specifically, the amount of token B can be locked up using the same hash that party B obtained from party A (who knows the private key used to generate the hash).

Since party A knows the private key used to generate the hash, party A can provide the private key to the HTLC smart contract storing token B to unlock and retrieve token B. In other words, the hash function can be applied to the private key to verify it against the hash used to generate the contract. This process necessarily reveals the private key to party B, who is then able to use the private key to unlock and retrieve token A from the HTLC smart contract on blockchain A. The use of HTLCs also requires both parties to acknowledge receipt of funds within a specified timeframe. If one party fails to confirm the transaction within the timeframe, then the entire transaction is voided, and funds are returned. In other words, the smart contracts are also configured to return the tokens to their corresponding parties if they are not withdrawn in a specified time period.

The above atomic swap implementation requires active participation by both party A and party B, and therefore requires some degree of technical knowledge and experience by both parties. The systems, methods, and atomic swap implementations disclosed herein seek to streamline and simplify cross-chain atomic swaps (e.g., to remove the active involvement of one party) while retaining security, and therefore involve different implementations than the classic atomic swap approach. The systems and methods disclosed herein add flexibility, which classic atomic swaps are lacking, and make atomic swaps convenient and safe for users.

At the core of some of the implementations of systems and methods disclosed herein may be a specialized escrow smart contract used to facilitate escrow and token transfers. To achieve cross-chain functionality, a copy of this contract may be deployed on both the origin chain (e.g., associated with the input token) and the destination chain (e.g., associated with the output token). In some implementations, copies of the smart contract may be deployed on any blockchain with smart contracts-including EVM-compatible blockchains, non-EVM compatible blockchains (e.g., TON, TRON, Near, Solana), and so forth. For example, in some implementations, both the origin chain and the destination chain may be EVM-compatible chains, and a copy of the escrow smart contract may be deployed on each participating EVM-compatible chain. In some aspects, the escrow smart contract may utilize novel cryptographic primitives to enable secure locking and unlocking of assets across different blockchain networks. In some implementations, the contract may implement advanced time lock mechanisms that leverage the underlying blockchain's consensus algorithm to enforce precise timing constraints on asset transfers. By integrating these timing mechanisms with cryptographic hash functions, the contract may create a trustless and atomic exchange process that was not previously possible across heterogeneous blockchain systems.

In some implementations, the escrow smart contract may incorporate a unique state machine design that allows it to maintain and verify complex multi-chain transaction states. This state machine may utilize efficient data structures, such as Merkle trees or vector commitments, to compactly represent and validate the status of assets across multiple blockchains. In some implementations, the ability of the smart contract to manage and transition between these complex states may enable more sophisticated cross-chain operations than traditional single-chain smart contracts.

In some implementations, the escrow smart contract may implement a novel signature scheme that allows for conditional release of assets based on cryptographic proofs from multiple blockchain networks. This multi-signature approach may leverage threshold cryptography to enable secure coordination between different blockchain ecosystems without requiring direct communication between them. The technical implementation of this signature scheme may significantly enhance the security and flexibility of cross-chain asset transfers. The escrow smart contract may further utilize advanced optimization techniques to minimize transaction costs and improve efficiency on resource-constrained blockchain networks. This may involve implementing custom bytecode-level optimizations, leveraging storage layout optimizations, and employing novel techniques for reducing call data size in contract interactions. These technical improvements may enable more cost-effective and scalable cross-chain operations. In some aspects, the escrow contract may incorporate self-healing mechanisms to handle network partitions or temporary blockchain forks. These mechanisms may utilize Byzantine fault-tolerant protocols to ensure the contract can recover and maintain consistent state even in the presence of network disruptions or conflicting blockchain states. This technical feature may significantly enhance the reliability and robustness of cross-chain asset exchanges. In some implementations, the specialized escrow smart contract may also implement a novel approach to handling different token standards and asset representations across various blockchain networks. This may involve developing a unified asset interface that can dynamically adapt to different token protocols, enabling seamless interoperability between diverse blockchain ecosystems. The technical implementation of this adaptive interface may greatly expand the range of assets that can participate in cross-chain swaps.

In some implementations, all deposit and withdrawal operations for the atomic swap may be executed by a resolver, sometimes referred to herein as the transacting/ executing resolver. The resolver is able to conduct withdrawals on behalf of the maker. For example, the resolver may be able to withdraw the resolver's escrowed output tokens and send said output tokens to the maker's wallet. The resolver may be able to withdraw the maker's escrowed input tokens and send said input tokens to the resolver's wallet by using a secret after its revelation. A target withdrawal address defined during the escrow creation makes it possible to limit withdrawals to one specific address.

In some implementations, the cross-chain atomic swaps disclosed herein may follow a protocol; the protocol workflow is divided into three main phases: the discovery or initialization phase, the depositing phase, and the withdrawal phase. These phases may primarily involve two key participants: the maker and the resolver.

During the discovery phase, a maker may initiate a cross-chain atomic swap by submitting an atomic swap order to the swap platform, which signals the maker's intent to perform the swap. Upon submission of the atomic swap order, the maker may send (e.g., via a frontend of the swap platform) an encrypted secret to a relayer service of the swap platform. In some implementations, the maker provides the secret to the swap platform, which will handle encryption of the secret. In some implementations, the maker submits the order, and the swap platform handles creation of the secret and encrypts the secret. In any case, the secret may be encrypted separately for each participating resolver using the respective unique public key of the resolver. In some implementations, the relayer may broadcast the atomic swap order to a plurality of resolvers and a Dutch auction may commence, during which the order's price decreases until it becomes reasonable for a resolver to fill the swap.

During the deposit phase, a resolver interested in filling the atomic swap order submitted by the maker may continue the swap process by using the maker's limit order to deposit the maker's tokens into an escrow smart contract on the origin chain. In some implementations, the resolver will have the necessary permission (e.g., collected by the swap platform, such as by obtaining the maker's permission in advance) to access the maker's wallet to transfer the input tokens referenced in the order request to the escrow smart contract. An escrow is established on the origin chain, incorporating details such as the secret hash, token type and amount, target address, and time lock specifications for both chains. The resolver deposits the agreed-upon amount into a corresponding escrow smart contract on the destination chain, employing the same secret hash and providing relevant escrow details.

During the withdrawal phase, the relayer service of the swap platform may verify that an escrow, containing the required token and amount, was created on the destination chain. The relayer service may then disclose the secret to all the resolvers.

Utilizing the secret, the executing resolver, within a certain exclusive time period, may unlock the assets intended for the maker in the escrow on the destination chain, simultaneously revealing the secret to the public. In some implementations, the resolver may withdraw the destination chain escrowed assets for the maker (e.g., transfer the assets to the maker's wallet address). The resolver can then use the same secret to unlock the maker's escrowed assets on the origin chain and transfer those input tokens to the resolver's wallet address, thereby finalizing the swap.

In some implementations, the process may comprise a recovery phase. More specifically, if neither party receives the designated assets on either chain before the time lock expires, any resolver can facilitate the transfer of escrowed assets back to their respective owners. Should the resolver fail to establish an escrow within the allocated time lock, the maker may be entitled to reclaim their assets from the origin chain escrow after the time lock expires.

Additionally, the protocol may include safety deposit mechanics. In some implementations, when a resolver deposits assets to an escrow contract, the resolver may include an additional amount of the chain's native asset, called a safety deposit. In some implementations, the resolver may receive the safety deposit back upon successful completion of the swap. In some implementations, a different resolver may receive the safety deposit under certain conditions. These conditions may include a situation in which the executing resolver does not, for whatever reason, successfully fulfill the swap in its allotted time frame and a different resolver completes a withdrawal or cancellation transaction. The existence of the safety deposit incentivizes other resolvers to step in if, for whatever reason, the first resolver does not complete the transaction. In a withdrawal, this other resolver may unlock the first resolver's escrow on the destination chain and cause the unlocked output tokens to be sent to the maker. In a cancellation, this other resolver may unlock the first resolver's escrow on the destination chain and cause the maker's escrowed assets to be returned to the maker.

To safeguard all participants from potential loss, the protocol incorporates several mechanisms, such as escrow time locks. Escrow time locks (sometimes referred to as a maker time lock or a resolver time lock) are time locks on the escrow contracts that ensure that all participants can retrieve their funds if a swap cannot be completed. For instance, if an escrow on the destination chain was not created or the secret has not been shared for any reason, participants can withdraw their funds after time lock expiration (known as withdrawal on cancel or cancellation).

More specifically, upon the creation of an escrow, a time lock is established to regulate the unlocking of assets for an intended recipient depending on the status of the swap. This time lock serves as a safeguard, ensuring that before its expiration, the assets can only be transferred to a predetermined target address (e.g., the wallet address of the party meant to receive the assets in the swap), and after the expiration, the assets can be directed to the original owner if the secret remains unknown. The implementation of time locks in this process provides a window for all participants to receive the assets intended for them or retrieve the assets they escrowed, depending on the success of the transaction and once the secret is revealed. This mechanism prevents either party from unilaterally seizing the other's assets and withdrawing their own prematurely.

Another mechanism for safeguarding participants from potential asset loss may be swap completion incentivization, which involves the protocol implementing a safety deposit mechanism that incentivizes resolvers to finalize the swap. More specifically, incentivization may be achieved by requiring the resolver to provide a safety deposit when creating an escrow. The resolver that unlocks the tokens on the escrow receives the safety deposit which both covers transaction costs and provides an incentive for executing the withdrawal. For example, the resolver that executes the swap (e.g., unlocks the escrow so the assets go to the intended recipient of the swap) would receive the safety deposit in the escrow. Alternatively, if the swap fails or is cancelled, the resolver that unlocks the escrow so the assets return to the original owner would receive the safety deposit in the escrow. After the relayer of the swap platform shares the secret with the resolvers, the executing resolver (i.e., the resolver that won the Dutch auction) has a limited time to exclusively complete the swap on the destination chain (in which case it will receive its safety deposit back).

Swap completion incentivization may streamline the withdrawal process and ensures its seamless execution without requiring active involvement of the maker. The swap completion incentivization may incentivize the transfer of assets to both target addresses if the secret was shared, indicating that both escrows exist, and regular withdrawal can be executed. The swap completion incentivization may also incentivize the transfer of assets back to their original owner if the secret was not shared. After the time lock expires, the cancellation withdrawal can be executed.

Another mechanism for safeguarding participants from potential asset loss may be secret sharing time locks. The secret is shared by the relayer at specific points of time, only upon certain conditions being met, and only with the whitelisted resolvers. Secret sharing time locks may be designed to ensure that chain finality (reorganization attacks) will not affect the swap and to protect the resolver executing the swap from losing their safety deposit.

The systems and methods for atomic swaps described herein may implement various mechanisms that allow for the secure handling and transmission of secrets used to execute the atomic swaps. In particular, a relayer service of the swap platform may be used to store and transmit the encrypted secret to resolvers. More specifically, the frontend decentralized application (dApp) used by the maker to submit an order may encrypt the secret using each participating resolver's public key. This encrypted secret is then transmitted to the relayer service, which stores the encrypted secret and only transmit it once certain conditions are met. The encrypted secret, which is only decryptable by a resolver's private key, is only shared with resolvers after reorg time locks (which are set separately for each chain) expire and upon verifying the creation of the escrow on the destination chain. Once the conditions are met, the relayer service acts as a relay and shares the encrypted secret with all of the whitelisted resolvers, thereby ensuring that a transacting resolver receives the secret only after it has fulfilled its part of the transaction. In return for the maker trusting the relayer service to handle the secret appropriately, the maker is provided convenience. The maker will receive full automation of the monitoring and transmission process. After initiating the swap, the maker can disengage, assured that the transaction will be completed autonomously once the resolver fulfills its obligations.

In some implementations, the protocol settings (e.g., the settings associated with the atomic swap implementations described herein) may be changeable; in some implementations, the protocol settings may be governed by a Decentralized Autonomous Organization (DAO). In some implementations, certain key parameters of the protocol may be controlled by the DAO to ensure that changes are made in the best interests of the community. An example of a setting controlled by the DAO may be a maximum swap amount. In some implementations, the protocol may be initially configured with a maximum swap amount (e.g., a hard cap on swap amounts) that serves as a risk management strategy designed to protect the ecosystem and its users from potential vulnerabilities or unforeseen market dynamics during the early stages of the protocol's deployment. The ultimate goal may be to incrementally ease these restrictions, with the intention of removing them entirely once the protocol has demonstrated its reliability over time. Accordingly, the DAO may be able to change this limitation over time in pursuit of that goal (e.g., by incrementally raising the maximum swap amount).

Another example of a setting controlled by the DAO may be the fee structure. For instance, resolver fees may be the fees that resolvers must pay to the DAO for executing atomic swaps on orders that are submitted to the swap platform. These fees may be a customizable parameter, and they may even be set to zero in order to disable fee collection. In some implementations, the DAO may be able to set and adjust fees to specific percentages or amounts. This ensures that fee adjustments can be made in response to changing market conditions, protocol needs or community preferences. This capacity for modification allows for a dynamic and responsive fee structure, aligning with the protocol's long-term objectives and sustainability.

FIG. 1 illustrates a system diagram comprising a swap platform that can be used to implement secure cross-chain atomic swaps, in accordance with implementations disclosed herein. For the purpose of facilitating understanding, components of the system are described in the singular whenever possible. However, it should be understood that, as implied by the figure, there can be multiple users 102 (each of which may have multiple corresponding user devices 106), multiple resolvers 140, multiple nodes (e.g., nodes 1 through N) in the distributed blockchain network 130, multiple centralized exchanges 150, and multiple decentralized exchanges 160.

Also for the purpose of facilitating understanding, aspects of the system may have been simplified or combined in the figure. For example, the resolver 140 is shown as a single block. However, in practice, a resolver 140 may not be a monolithic component of the system, but instead it could have multiple components that are spread across physical and virtual space. For example, a resolver 140 could comprise one or more off-chain applications and one or more on-chain applications (e.g., smart contracts), such as a set of on-chain and off-chain applications that are developed by a third party. Thus, it should also be understood that aspects of the system may be configured, arranged, or distributed differently than what is represented in the figure.

In some implementations, there may be one or more user devices 106, one or more resolvers 140, one or more nodes of one or more distributed blockchain networks 130, one or more centralized exchanges 150, one or more decentralized exchanges 160, and a swap platform 120 that are interconnected and in electronic communication through a network 110 (e.g., the Internet).

In some implementations, there may be an application 104 that is accessible on a user device 106. The user 102 may be able to access and interact with the application 104 in order to initiate token swaps through the swap platform 120. The application 104 may provide a user interface through which the user 102 may be able to submit swap requests. Some non-limiting examples of the user device 106 may include a mobile phone, a smartphone, a laptop, a desktop, a tablet, and/or any other personal computing device.

In some implementations, the application 104 may be installed and then executed on the user device 106, as is often the case with software applications or mobile applications. In some implementations, the application 104 may be a web-based application that can be accessed by the user device 106 (e.g., via a browser). In some implementations, the application 104 may serve as a frontend to a corresponding backend for implementing token swaps, such as the backend 124 of the swap platform 120. In some implementations, the application 104 may serve as a frontend for a decentralized application (dApp), which is a digital application or program that runs on a decentralized network rather than a single computer or server. dApps are often built on blockchain technology and use cryptocurrency as a means of exchange.

In some implementations, there may be a distributed blockchain network 130 operating on a plurality of nodes (e.g., nodes 1 through N). The distributed blockchain network 130 may be a peer-to-peer (P2P) computer network that manages and maintains a blockchain 132, which is a public distributed ledger with growing lists of transaction records (blocks) that are securely linked together via cryptographic hashes. The nodes of the distributed blockchain network 130 may collectively adhere to a consensus algorithm protocol to add and validate new transaction blocks to the blockchain 132. The execution of transactions on the blockchain 132 may involve a cryptocurrency or token, which operates as a decentralized medium of exchange within the distributed blockchain network 130. The blockchain 132 may also allow for smart contracts (e.g., scripts or programs) that are stored on the blockchain 132 and that can be partially or fully executed without human interaction when predetermined conditions are met. An example of the distributed blockchain network 130 may be the Ethereum network, and an example of the blockchain 132 may be the Ethereum blockchain.

In some implementations, there may be one or more centralized exchanges (CEXes) 150. A centralized exchange 150 may be an online platform used to buy and sell cryptocurrencies. More specifically, a centralized exchange 150 may be an online platform operated by an intermediary or third party that is entrusted with handling the assets of buyers and sellers to help facilitate/conduct cryptocurrency transactions between those buyers and sellers.

In some implementations, there may be one or more decentralized exchanges (DEXes) 160. A decentralized exchange 160 may be an online platform that allows the peer-to-peer exchange of cryptocurrencies without an intermediary or third party to validate or process the transaction. The decentralized exchange 160 may use smart contract and atomic swap (e.g., cross-chain swaps) technology to implement automated, self-enforcing cryptocurrency exchange contracts for executing these peer-to-peer transactions.

In some implementations, there may be a swap platform 120 that enables secure cross-chain atomic swaps, as disclosed herein. In some implementations, the swap platform 120 may be a decentralized finance (DeFi) platform. The swap platform 120 or some of its components may be implemented across the blockchain 132 and the nodes of the distributed blockchain network 130 instead of being standalone (e.g., operated on a separate backend server), For example, the swap platform 120 may comprise smart contracts and protocols 122, which consist of autonomous code or programs that are integrated into the blockchain 132 and hosted on the nodes of the distributed blockchain network 130. These smart contracts and protocols 122 may enable cross-chain swaps to be performed (e.g., via escrow smart contracts that can lock up tokens and unlock them for withdrawal when certain conditions are met).

The figure only illustrates some examples of the smart contracts and protocols 122 used by the swap platform 120 and is not meant to be an exhaustive reference. One example of the smart contracts and protocols 122 used by the swap platform 120 may be a settlement protocol. The settlement protocol may be an intermediary set of smart contracts that are used by the resolvers 140 to execute and fill swap orders.

Another example of the smart contracts and protocols 122 used by the swap platform 120 may be an aggregation protocol. In some implementations, the aggregation protocol may be a discovery and routing algorithm, which offers asset exchanges at the best rates on the market. The aggregation protocol may be able to find the most efficient paths for a token swap, and it may be able to split between different protocols and even different market depths within one protocol in the shortest possible time. In other words, the aggregation protocol may source liquidity from various exchanges and be capable of splitting a single trade transaction across multiple DEXes to ensure the best rates. In some implementations, the aggregation protocol may be used in various aggregation information services.

Another example of the smart contracts and protocols 122 used by the swap platform 120 may be a liquidity protocol. In some implementations, the liquidity protocol may be an automated market maker (AMM) that aims to offer capital-efficient liquidity positions while protecting users from front-running.

Another example of the smart contracts and protocols 122 used by the swap platform 120 may be a limit order protocol. In some implementations, the limit order protocol may be a set of smart contracts that allows users to place limit orders and RFQ orders, which later can be filled on-chain. Both types of orders are a data structure created off-chain and signed according to EIP-712. The limit order protocol may enable gasless limit orders, and it may provide benefits such as extreme flexibility and high gas efficiency.

In some implementations, the smart contracts and protocols 122 may include an atomic swap protocol and escrow smart contracts (not shown). In some implementations, the atomic swap protocol and escrow smart contracts may be used to perform secure cross-chain atomic swaps. For example, the escrow smart contracts may be used by resolvers 140 to lock up tokens and the tokens may be unlocked for withdrawal when certain conditions are met.

In some implementations, the smart contracts and protocols 122 may include a staking contract (not shown). In particular, the swap platform 120 may be associated with its own swap platform tokens 128 ("platform tokens"). In some implementations, any user of the swap platform 120 (including resolvers 140) may be able to stake/lock their platform tokens 128 via a staking contract over the duration of a lock period, in exchange for "voting power" that may be used in various scenarios. In some implementations, the platform tokens 128 may be an ERC-20 token that is used to participate in the swap platform's DAO governance process.

In some implementations, the lock period could be any time between 1 day and 4 years. In some implementations, the longer the lock period, the more voting power a user may receive on their staked platform tokens. For example, a 4 year lock period may result in 1 voting power being given to a user for each platform token staked, a 3 year lock period may result in 0.5623 voting power being given to a user for each platform token staked, a 2 year lock period may result in 0.3162 voting power being given to a user for each platform token staked, a 1 year lock period may result in 0.1778 voting power being given to a user for each platform token staked.

In some implementations, users may be able to use their voting power with a delegation system that provides users with a series of delegation contracts, each of which is associated with a specific topic for delegation. Examples of topics may include governance voting and gasless-swap resolving. In some implementations, each topic may be project specific and independent from all other topics, which allows differentiation between different entities based on their area of responsibility. Users may be able to independently delegate their staked platform tokens and voting power to different entities in different areas according to their own personal preferences.

In some implementations, the swap platform 120 may comprise a backend 124 (e.g., for the application 104) and backend services. The figure only illustrates some examples of the components and services associated with the backend 124 and is not meant to be an exhaustive reference. For example, there can be various application programming interfaces (APIs) that enable communication and interaction with the swap platform 120. As another example, there can be an aggregation information service, which leverages the aggregation protocol to find the most efficient paths for a token swap. As another example, there can be a relayer service for transmitting orders to the resolvers 140 to act on. As another example, there can be a quoter service for estimating the results of orders submitted to the swap platform 120 and generating grid curves.

In some implementations, the swap platform 120 may include logic for one or more liquidity source(s) 126, examples of which include a decentralized exchange, a centralized market maker, an automated market maker, order book DEX, and DEX aggregator. In some implementations, the liquidity source 126 may utilize some of the components and mechanisms of the swap platform, such as the various smart contracts and protocols 122, to perform transactions such as token swaps.

In some implementations, the resolvers 140 are entities, private market makers (PMMs) or other persons, who compete in attempts to fill and execute the orders submitted by the users. Thus, any person or entity may become a resolver 140, provided that certain requirements are met. In some implementations, resolvers 140 may need to be whitelisted to be able to participate in filling user orders through the swap platform 120. In some implementations, resolvers 140 may need to stake platform tokens 128 to be put on the whitelist. The stake may determine a resolver's ability to get orders and ensures that a resolver follows the protocol rules (like in a proof of stake model). In some implementations, to be put on the whitelist, the resolvers 140 may be required to stake an amount of platform tokens 128 for any lock period to have enough voting power to get into the top N stakers (e.g., N=10). To meet this requirement, a resolver 140 may itself possess and stake that amount of platform tokens, or the resolver 140 may be able to attract users that will delegate to the resolver 140 their staked platform tokens or voting power in exchange for rewards.

Accordingly, one of the requirements to become a resolver 140 may be that an entity may need to stake enough platform tokens to obtain sufficient voting power. Other requirements for becoming a resolver 140 may include having an entity register as a resolver 140 via a smart contract of the swap platform 120. Other requirements for becoming a resolver 140 may include having an entity deposit enough assets into an account (e.g., USDC to FeeBank) that will enable the entity to cover the gas fees and other resolving fees associated with executing transactions. Other requirements for becoming a resolver 140 may include having an entity go through a verification process such as KYC/KYB, including wallet/account screening to ensure that the account of the entity is not related to any illicit activities.

Figure 2:
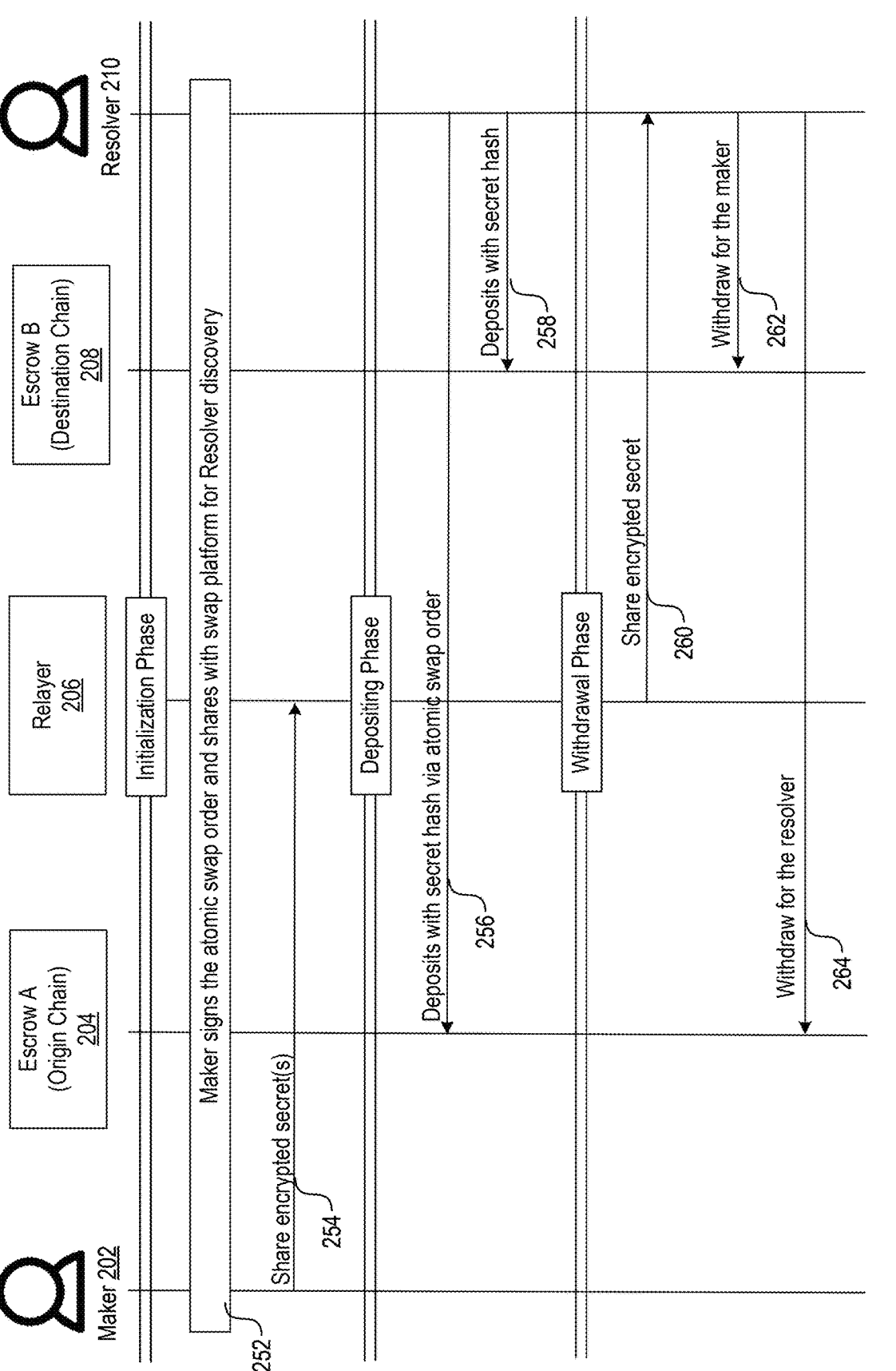
FIG. 2 is a sequence diagram that illustrates a simplified overview of the process for a secure cross-chain atomic swap, in accordance with implementations described herein.

FIG. 2 is a sequence diagram that illustrates a simplified overview of the process for a secure cross-chain atomic swap, in accordance with implementations described herein. In some implementations, the maker 202 (e.g., a user of the swap platform) may configure an order for a token swap (e.g., using a frontend for a swap platform available on their user device) in which some amount of an input token (e.g., a token associated with an origin chain) is exchanged for some amount of an output token (e.g., a token associated with a destination chain). In some implementations, the order may be an atomic swap order (e.g., for a cross-chain token swap performed atomically). Accordingly, a maker 202 may be able to enter and configure parameters for the atomic swap order.

In some implementations, the order may be a limit order. In some of such implementations, the limit order may be executed based on a Dutch auction approach. For example, the limit order may execute at a price that depends on the time of its inclusion in a block. More specifically, the execution price may decrease over the duration of a Dutch auction. In some implementations, the Dutch auction starts at a price that is estimated to be better for the maker 202 than the current estimated market price. The order's execution price then decays over time until it hits the worst price the maker 202 would be willing to accept (e.g. a minimum amount of output token). Resolvers may be incentivized to fill such a limit order as soon as it is profitable for them to do so, since they risk losing the order to another resolver willing to take a smaller profit.

In some implementations, the maker 202 may be able to configure parameters for the limit order, such as the input token, an amount of the input token (e.g., to swap), an output token, a starting amount of output token (e.g., a maximum amount of output token, at which a Dutch auction may start at), a minimum amount of output token to be received, and/or a time threshold or time window (e.g., associated with the execution approach, such as a duration or deadline for the Dutch auction). In some implementations, the maker 202 may be able to set parameters that may determine the rate and speed of execution of the order, such as parameters associated with swap rate (the time of order's execution may correlate with the swap rate, with a higher rate correlating to a longer execution time) and/or and any presets for the execution approach (e.g., "Fast," "Fair," "Auction"). In some implementations, the auction price may decay over the duration of the auction (e.g., from the maximum amount of output token to the minimum amount of output token).

In some implementations, the maker 202 may also be requested to provide approval for moving their input tokens. For example, in some implementations, the swap platform may utilize smart contracts with token approval functionality that enables the maker 202 to grant approval to move tokens from the user to the resolver. The smart contract can be any smart contract having a token approval function for verifying the user's authorization before performing a token transfer. Non-limiting examples of such smart contracts may include Permit and Permit2, a token approval contract that uses signature-based approvals and transfers for any ERC20 token. Accordingly, the maker 202 may have to sign the order before an actual swap or transaction can be performed.

Accordingly, at step 252, the maker 202 may provide permission or authority for the swap platform to perform an atomic swap, such as by signing the atomic swap order. For example, the order itself may be digitally signed by the maker 202 (e.g., in accordance with the EIP-712 standard) to provide permission for the swap platform to swap an amount of input tokens specified in the order.

Once the maker 202 has finished configuring and signing the order, the maker 202 may submit the order through the frontend to the swap platform (e.g., a backend of the swap platform), which will register the atomic swap order of the maker 202 for the purposes of resolver discovery (e.g., so that potential resolvers can be made aware of the order). For example, the swap platform could broadcast the order to a set of resolvers (e.g., whitelisted resolvers participating on the swap platform) or the set of resolvers may pull updated orders from the swap platform. In some implementations, after the maker 202 submits an atomic swap order to the swap platform, a complex sequence of actions may be executed to resolve the swap. A Dutch auction may commence, decreasing the order's price until it becomes profitable for a resolver to fill the swap.

Accordingly, the signed atomic swap order provided to the swap platform may include the configured parameters for the order, such as the input token, the input token amount, the output token, the starting/maximum output amount, the minimum output token amount, the time threshold or deadline for a Dutch auction, and so forth. In some implementations, the signed atomic swap order may include a decay function or something similar, specifying how the auction price may decay over the duration of the auction (e.g., from the maximum amount of output token to the minimum amount of output token). The signed atomic swap order may include permission or authorization for the swap platform to move the specified tokens for the maker 202, which can be in the form of a signature-based approval (e.g., a digital signature of the maker 202) associated with token approval functionality.

At step 254, upon submission of an atomic swap order, the maker 202 may also generate and send an encrypted secret and a secret hash (e.g., a hash of the secret generated using a one-way hashing function known to the escrow smart contracts described herein) to the swap platform. More specifically, the frontend on the device of the maker 202 may generate a secret hash and an encrypted secret from a secret, and then send the secret hash and the encrypted secret to the relayer 206 of the swap platform. In some implementations, there may be multiple encrypted secrets; an encrypted secret may be encrypted separately for each participating resolver in the swap network using the corresponding unique public key of the respective resolver. In other words, although not shown in the figure, the frontend may generate multiple encrypted secrets (e.g., one for each potential resolver) off the secret and provide them all to the swap platform along with the secret hash. The relayer 206 may provide information about this particular swap order along with the secret hash to all the resolvers. At a later time, the relayer 206 may provide the encrypted secret that corresponds to each respective resolver for use in executing this particular swap order. Accordingly, relayer 206 may be the service or component of the swap platform that is tasked with storing and transmitting the encrypted secret.

The secret may be a cryptographically secure random value, typically generated using a cryptographic random number generator (CSPRNG). This value may be of sufficient length, such as 256 bits, to ensure resistance against brute-force attacks. In some implementations, the secret may serve as a cryptographic commitment, where its hash is used to lock assets in escrow contracts across multiple blockchains. The hash function applied to the secret may be a secure, collision-resistant algorithm such as SHA-256 or Keccak-256. The secret may function as a key element in a hash time-locked contract (HTLC) implementation. In this context, it may enable the atomic nature of the swap by ensuring that assets can only be claimed if the correct preimage (the secret itself) is revealed within a specified timeframe. In some cases, the secret may be encrypted using asymmetric encryption algorithms like RSA or elliptic curve cryptography (ECC) when transmitted between parties. This encryption may ensure that only the intended recipient can decrypt and use the secret to claim assets. The secret may be utilized in zero-knowledge proof systems to enable privacy-preserving verification of swap execution. For example, it may be incorporated into a zk-SNARK circuit to prove knowledge of the secret without revealing its actual value. In some implementations, the secret may be combined with other data using cryptographic techniques like XOR operations or key derivation functions (KDFs) to generate unique identifiers or keys for specific swap transactions. The management and distribution of the secret may involve secure multiparty computation (MPC) protocols, allowing multiple parties to jointly compute functions over the secret without any single party learning the actual value.

Although not all shown in the figure, there may be a set of resolvers (e.g. whitelisted resolvers) that learn of the atomic swap order. These resolvers may have their own algorithms and logic for determining whether to fill the order (e.g., as a counterparty for the swap) and how to fill the order. Each resolver may employ their own logic to enable their transactions to be profitable. The swap platform does not mandate how any specific resolver fills the order, and that resolver is free to source liquidity from on-chain liquidity venues like a DEX, off-chain liquidity, and so forth. Any resolver could choose not to fill the order. Accordingly, not every available resolver will be a counterparty for the swap. A resolver may also choose to fill part of the order. Accordingly, there could be multiple resolvers that are counterparties to the swap, with each of those resolvers filling a part of the order.

However, for the purpose of facilitating ease of understanding (and not to restrict participation to a single resolver), FIG. 2 is simplified and illustrates only a single resolver 210 that has decided to fill the atomic swap order. In some implementations, a backend of the resolver 210 (e.g., an application or program) may automatically make the determination to determine if and how to fill the order without needing additional human intervention. Regardless, in some implementations, once the resolver 210 has determined to fill the order, the resolver 210 may indicate to the swap platform that it intends to fill the order (e.g., via an API or a smart contract associated with the swap platform). In some implementations, the swap platform may check or confirm that resolver 210 is on a whitelist and permitted to fill the order. This may conclude the off-chain phase and initiate the on-chain phase for resolving the swap.

It should be noted that, in some implementations, the resolver 210 may handle many of the steps involved in the atomic swap (e.g., to streamline the withdrawal process and perform it without active involvement of the maker 202). However, the swap platform (e.g., smart contracts, protocols, or services of the swap platform) may oversee settlement and execution of the swap to check or verify execution of the swap to ensure the swap order's conditions have been met or that the swap matches the parameters set by the maker 202.

At step 256, once the resolver 210 has decided to fill the order, the resolver 210 may initiate the swap by depositing the maker 202's input tokens into escrow A 204, which is an escrow smart contract established on the origin blockchain (e.g., associated with the input token). In some implementations, escrow A 204 may incorporate details such as the secret hash (e.g., the secret hash provided to the resolver 210, which was previously generated from the secret using a hashing function known to escrow A 204), token type and amount, target address (e.g., a wallet address that is permitted to withdraw the input tokens), and time lock specifications for both chains (e.g., the origin blockchain and the destination blockchain). In some implementations, this escrow smart contract may be associated with the swap platform. In some implementations, the resolver 210 may use the maker 202's signed order to be able to deposit the specified amount of the maker 202's input tokens into escrow A 204.

At step 258, the resolver 210 may also deposit the agreed-upon amount of output token (such as the amount of output token specified at that point in the Dutch auction) from their own wallet into escrow B 208, which is an escrow smart contract established on the destination blockchain (e.g., associated with the output token). In some implementations, escrow B 208 may employ the same secret hash as escrow A 204 (e.g., the secret hash provided to the resolver 210, which was previously generated from the secret using a hashing function known to escrow B 208). In some implementations, escrow B 208 may incorporate relevant escrow details such as token type and amount, target address (e.g., a wallet address that is permitted to withdraw the input tokens), and time lock specifications for both chains (e.g., the origin blockchain and the destination blockchain).

In some implementations, an element of the swap platform, such as relayer 206, may check and verify that the swap will proceed within the parameters set by the maker 202. For example, the relayer 206 may check to ensure that escrow B 208 exists on the destination chain and that it contains the required amount of output token. In some cases, the required amount of output token may have changed over time (e.g., decreasing over the duration of the Dutch auction), and the relayer 206 may ensure that the deposited amount of output token is correct (e.g., it corresponds to current state of the Dutch auction) and that it is within the parameters set by the maker 202 (e.g., it is above the minimum amount that the maker 202 is expecting to receive).

Once verified, at step 260, the relayer 206 may distribute or share the encrypted secret(s) (e.g., the encrypted secret(s) provided by the maker 202, each of which was generated by encrypting the secret with the corresponding public key of the respective resolver) with all of the resolvers, including resolver 210. In some implementations, the relayer 206 may share all of the encrypted secrets with all of the resolvers. In some implementations, the relayer 206 may only share with each resolver the encrypted secret for that resolver (e.g., the encrypted secret generated using the public key of that resolver). Each resolver may be able to use the private key in its possession to decrypt its corresponding encrypted secret to learn the underlying secret.

At step 262, the resolver 210 may utilize the secret to unlock the assets for the maker 202 on the destination chain before the time lock expires. More specifically, the resolver 210 may provide the secret to escrow B 208, which will hash the secret and compare that result to the secret hash used to establish the escrow B 208, then unlock the output tokens deposited with escrow B 208 on the destination chain. This may simultaneously reveal the secret to the public (e.g., the secret may become visible to scrutiny of the destination chain). In some implementations, the resolver 210 may facilitate the maker 202's retrieval of the unlocked output tokens deposited with escrow B 208 (e.g., by transferring them to the wallet address of the maker 202). In some implementations, the unlocked output tokens deposited with escrow B 208 may be automatically transferred to the wallet address of the maker 202 (e.g., the specified target address associated with escrow B 208).

At step 264, the resolver 210 may use the same secret to unlock the assets for themselves on the origin chain before the time lock expires. More specifically, the resolver 210 may provide the secret to escrow A 204, which will hash the secret and compare that result to the secret hash used to establish the escrow A 204, then unlock the input tokens deposited with escrow A 204 on the origin chain. This will enable resolver 210 to retrieve the input tokens, thereby finalizing the swap.

All of this is assuming that escrow A 204 and escrow B 208 were successfully established and that the assets on escrow A 204 and escrow B 208 were successfully unlocked and retrieved before expiration of the respective time locks of escrow A 204 and escrow B 208 (the details of which are included in both escrow A 204 and escrow B 208). However, in the case that neither party receives the designated assets on any chain before the time locks expire, any resolver can facilitate the transfer of those assets back to the rightful owner. Should the resolver 210 fail to establish escrow B 208 within the allocated time lock, the maker 202 is entitled to reclaim their assets from escrow A 204 (the origin chain escrow) after the time lock expires.

In order to incentivize other resolvers to facilitate these transfers (e.g., the transfer of assets back to their rightful owners after a failed swap and time lock expiration), safety deposit mechanics may be utilized. In some implementations, when a resolver deposits assets to an escrow smart contract, the resolver also includes an additional amount of the chain's native asset as a safety deposit. This safety deposit goes to the winning executor of a withdrawal or cancellation transaction, thereby incentivizing other resolvers to help withdraw assets (e.g., when a swap has failed)—in particular, withdraw assets for the maker 202 during withdrawal or cancellation periods. For example, when resolver 210 establishes escrow A 204 and deposits the maker 202's input tokens, the resolver 210 may also include an additional amount of input token (from their own wallet) as a safety deposit. If the swap has failed or is canceled, another resolver may return the maker 202's input tokens back to the maker 202 and receive the safety deposit as compensation.

Figure 3:
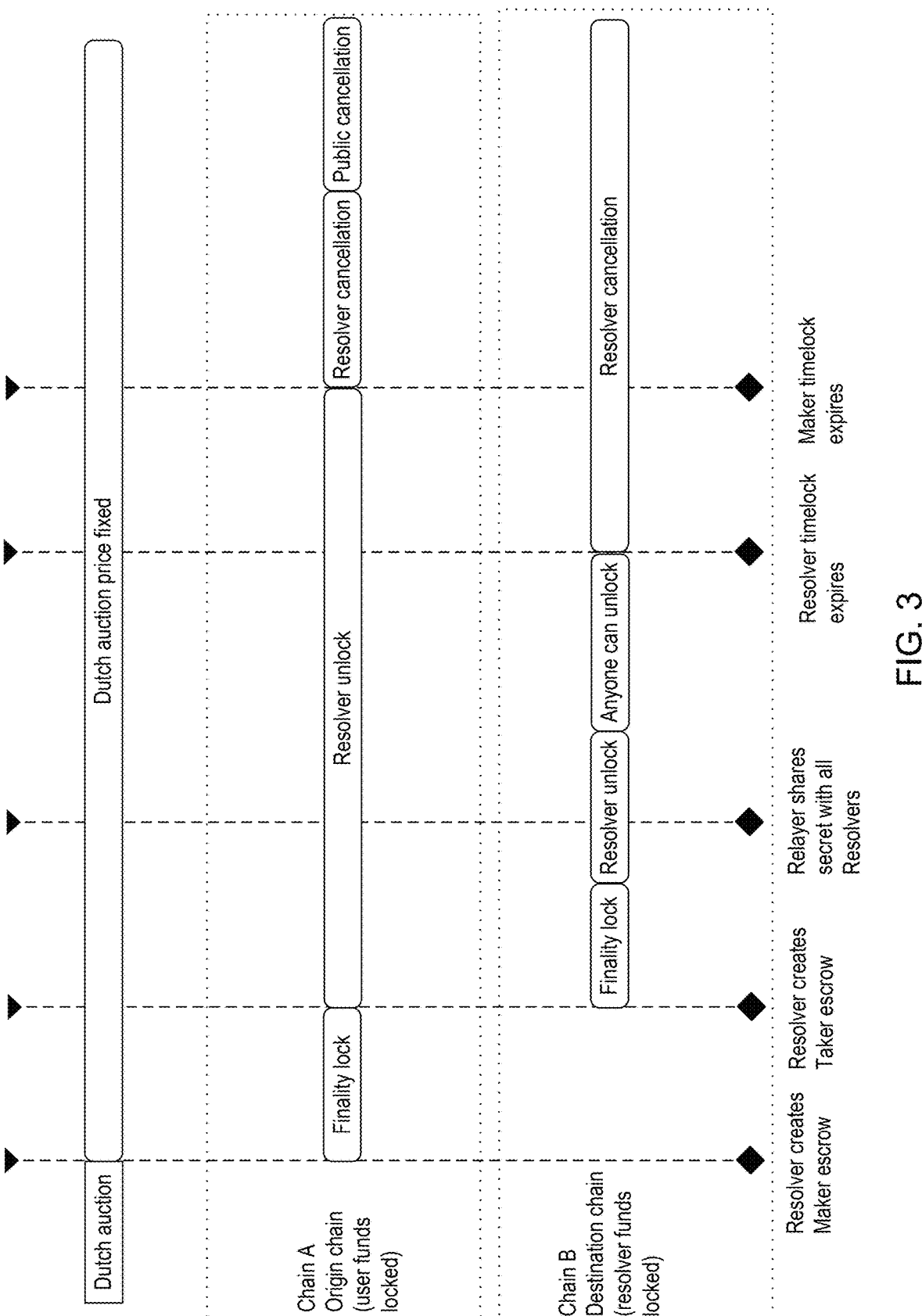
FIG. 3 is a timeline that illustrates example timings associated with secure cross-chain atomic swaps, in accordance with implementations described herein.

FIG. 3 is a timeline that illustrates example timings associated with cross-chain atomic swaps, in accordance with implementations described herein.

To mitigate the risk of blockchain reorganization attacks, the protocol incorporates a reorg lockdown period following the creation of each escrow (e.g., escrow A 204 and escrow B 208, as shown in FIG. 2). During the reorg lockdown period of an escrow, withdrawals and cancellations are prohibited for the escrow.

Assuming that the maker has the necessary assets (e.g., the required amount of input token) and provided approval to perform an atomic swap order, a resolver will create escrow A on the origin chain (e.g., at step 256 in FIG. 2, resolver 210 creates escrow A 204 on the origin chain) with the secret hash, deposit the maker's assets to escrow A, and add a safety deposit (an additional amount of input token) to the escrow A. Upon creation of this escrow A, the Dutch auction price becomes fixed. A reorg lockdown period is also applied to this escrow A (shown in FIG. 3 as a "finality lock" period associated with the origin chain), and during this period, withdrawals from escrow A are prohibited and the secret remains unknown to all resolvers. Once the reorg lockdown period for escrow A expires, a period begins during which the resolver will be technically permitted to withdraw from escrow A (shown in FIG. 3 as a "resolver unlock" period associated with the origin chain) while the maker also will be prevented from withdrawing from escrow A (e.g., by means of a maker time lock applied to escrow A). However, during this period, the resolver will be unable to withdraw from escrow A as a practical matter until it learns of the secret (e.g., until the secret is shared by the relayer).

After the reorg lockdown period for escrow A on the origin chain expires, the resolver can safely create the second escrow B on the destination chain with the secret hash, deposit its own assets (e.g., an amount of output tokens), and add a safety deposit (an additional amount of output token). A reorg lockdown period is then applied to escrow B as well (shown in FIG. 3 as a "finality lock" period associated with the destination chain). During this period, withdrawals from escrow B are prohibited. Since the underlying secret is still unknown to the resolver at this point, the resolver cannot withdraw the assets from escrow A on the origin chain. The maker knows the underlying secret, but withdrawals from escrow B are prohibited during this period; the maker cannot unlock the assets from escrow B on the destination chain until this lockdown period expires.

After the reorg lockdown period for escrow B on chain B expires, a period begins during which the resolver will be technically permitted to withdraw from escrow B (shown in FIG. 3 as a "resolver unlock" period associated with the destination chain). During this period, the resolver may have the exclusive ability to withdraw from escrow B (e.g., other resolvers are not permitted to withdraw from escrow B). However, as a practical matter, the resolver will be unable to do so until it learns the secret (e.g., from the relayer) needed to unlock the assets on escrow B. Accordingly, during this resolver unlock period, the resolver will send proof of escrow to the relayer. The relayer verifies that the appropriate escrow(s) have been established, such as by verifying the creation of escrow B on the destination chain. Then (e.g., at step 260 in FIG. 2), the relayer shares the secret with all resolvers, including the transacting resolver that sent the proof of escrow. More specifically, the relayer may share the encrypted secret with all the resolvers, each of which will decrypt the encrypted secret with their own private key to learn the underlying secret.

In some implementations, upon learning the secret, the transacting resolver has a limited exclusive timeframe to complete the swap and unlock both escrows, transferring the assets to their intended recipients and claiming back their security deposit. This limited exclusive timeframe is shown in FIG. 3 as the timeframe during which the resolver unlock period for the origin chain overlaps with resolver unlock period for the destination chain. During this limited exclusive timeframe, both parties (the maker and resolver) are aware of the secret and have the ability to unlock the escrows. If the shared secret is invalid for any reason, nothing happens, and both the maker and resolver can retrieve their assets during the cancellation period.

This limited exclusive timeframe may be a result of constraints implemented through escrow B, which also cause the resolver unlock period on the destination chain to end sooner. More specifically, escrow B may be configured to provide the transacting resolver with first access to the assets on escrow B (e.g., a limited period in which only it can access the assets on escrow B) before access is opened up to all resolvers. This allows the transacting resolver to have a chance to retrieve its own safety deposit that it added to escrow B. In some implementations, escrow B may have a resolver-exclusive hash time lock that requires that the transacting resolver provide the secret before the time period expires.

After the resolver's exclusive execution period is over (shown as the "anyone can unlock" period for the destination chain in FIG. 3), any resolver may be able to claim the safety deposit from escrow B on the destination chain by unlocking escrow B with the secret and transferring the unlocked output tokens to the maker. It should be noted that there is no need for a public unlock period on the origin chain (and thus, no corresponding "anyone can unlock" period shown for the origin chain in FIG. 3) since the transacting resolver will be interested in retrieving its assets (e.g., the amount of input token and the additional safety deposit) without additional incentives.

The "anyone can unlock" period may persist until the resolver time lock on escrow B expires, after which the transacting resolver is allowed to retrieve their assets from escrow B without needing the correct secret. For example, if the secret was not shared with all the resolvers by the relayer, such as may be the case if escrow B was not verified, then the transacting resolver can recover its original assets that it deposited on escrow B once the resolver time lock on escrow B has expired. This time period is shown in FIG. 3 as the "resolver cancellation" period in the destination chain.

Similarly, once the maker time lock on escrow A expires, the maker is allowed to retrieve their assets from escrow A. As depicted in FIG. 3, the resolver time lock duration on escrow B is shorter than the maker time lock duration on escrow A. This arrangement may protect the transacting resolver from malicious users/makers, allowing the transacting resolver to recover their assets if the swap has not been completed for any reason. In these scenarios, the maker is at a disadvantage but is protected by the fact that all resolvers may be sufficiently-trusted entities (e.g., that have passed KYC/KYB procedures and have legally enforceable agreements with the swap platform).

FIG. 3 also shows the cancellation period on the origin chain as separated into two parts once the maker time lock on escrow A expires and the maker is allowed to retrieve its assets from escrow A. During the "resolver cancellation" period, only the executing resolver has the ability to cancel escrow A and return the deposited assets to the maker, thus giving the executing resolver the chance to secure their safety deposit that they deposited on escrow A. If the executing resolver does not do that, then during the "public cancellation" period, any of the resolvers may be able to cancel escrow A, return the deposited assets to the maker, and claim the safety deposit. In some implementations, there may be a separate time lock on escrow A that initiates the "public cancellation" period.

Accordingly, in various implementations, escrow A may have one or more of: a reorg time lock, a hash time lock (e.g., that unlocks the assets on escrow A if the correct secret is provided within a period of time), a maker time lock (e.g., which allows the maker to recover assets on escrow A once it expires), and a resolver-exclusive cancellation time lock (e.g., which allows the transacting resolver to cancel escrow A within a period of time before it is opened up to all resolvers).

Accordingly, in various implementations, escrow B may have one or more of: a reorg time lock, a resolver-exclusive hash time lock (that unlocks the assets on escrow B for the transacting resolver if it provides the correct secret within a period of time), a non-exclusive hash time lock (that unlocks the assets on escrow B if the correct secret is provided within a period of time), and a resolver time lock (e.g., which allows the transacting resolver to recover assets on escrow B once it expires).

Computer Systems

Figure 4:
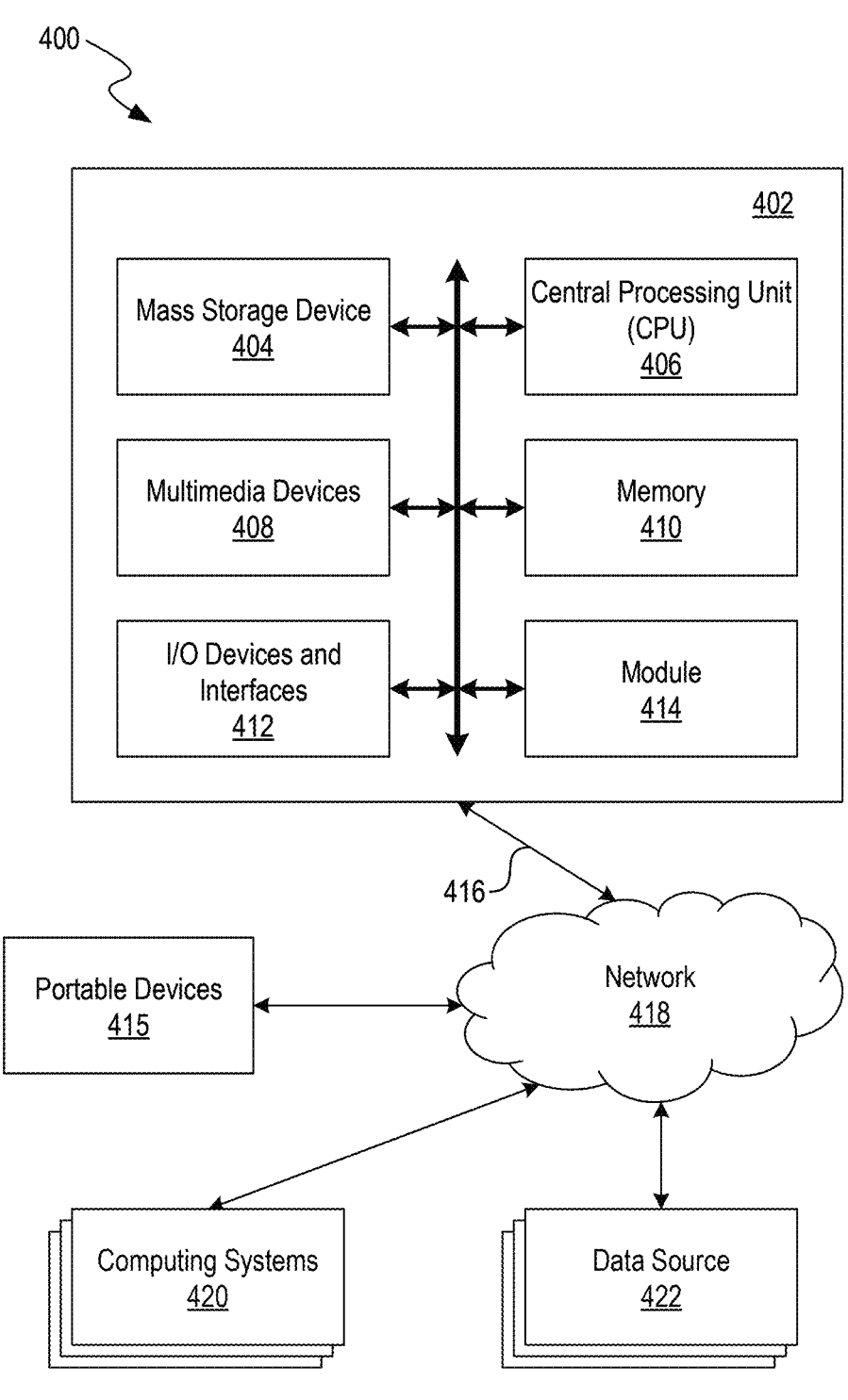
FIG. 4 is a block diagram depicting an embodiment of a computer hardware system configured to run software for implementing the approaches for cross-chain atomic swaps and any systems, methods, and devices disclosed herein.

FIG. 4 is a block diagram depicting an embodiment of a computer hardware system configured to run software for implementing cross-chain atomic swaps and any systems, methods, and devices disclosed herein. The example computer system 402 is in communication with one or more computing systems 420 and/or one or more data sources 422 via one or more networks 418. While FIG. 4 illustrates an embodiment of a computing system 402, it is recognized that the functionality provided for in the components and modules of computer system 402 may be combined into fewer components and modules, or further separated into additional components and modules.

The computer system 402 can comprise a module 414 that carries out the functions, methods, acts, and/or processes described herein. The module 414 is executed on the computer system 402 by a central processing unit 406 discussed further below.

In general, the word "module," as used herein, refers to logic embodied in hardware or firmware or to a collection of software instructions, having entry and exit points. Modules are written in a program language, such as JAVA, C or C++, Python or the like. Software modules may be compiled or linked into an executable program, installed in a dynamic link library, or may be written in an interpreted language such as BASIC, PERL, LUA, or Python. Software modules may be called from other modules or from themselves, and/or may be invoked in response to detected events or interruptions. Modules implemented in hardware include connected logic units such as gates and flip-flops, and/or may include programmable units, such as programmable gate arrays or processors.

Generally, the modules described herein refer to logical modules that may be combined with other modules or divided into sub-modules despite their physical organization or storage. The modules are executed by one or more computing systems and may be stored on or within any suitable computer readable medium or implemented in-whole or in-part within specially designed hardware or firmware. Not all calculations, analysis, and/or optimization require the use of computer systems, though any of the above-described methods, calculations, processes, or analyses may be facilitated through the use of computers. Further, in some implementations, process blocks described herein may be altered, rearranged, combined, and/or omitted.

The computer system 402 includes one or more processing units (CPU) 406, which may comprise a microprocessor. The computer system 402 further includes a physical memory 410, such as random-access memory (RAM) for temporary storage of information, a read only memory (ROM) for permanent storage of information, and a mass storage device 404, such as a backing store, hard drive, rotating magnetic disks, solid state disks (SSD), flash memory, phase-change memory (PCM), 3D XPoint memory, diskette, or optical media storage device. Alternatively, the mass storage device may be implemented in an array of servers. Typically, the components of the computer system 402 are connected to the computer using a standards-based bus system. The bus system can be implemented using various protocols, such as Peripheral Component Interconnect (PCI), Micro Channel, SCSI, Industrial Standard Architecture (ISA) and Extended ISA (EISA) architectures.

The computer system 402 includes one or more input/output (I/O) devices and interfaces 412, such as a keyboard, mouse, touch pad, and printer. The I/O devices and interfaces 412 can include one or more display devices, such as a monitor, which allows the visual presentation of data to a user. More particularly, a display device provides for the presentation of graphical user interfaces (GUIs) as application software data, and multi-media presentations, for example. The I/O devices and interfaces 412 can also provide a communications interface to various external devices. The computer system 402 may comprise one or more multi-media devices 408, such as speakers, video cards, graphics accelerators, and microphones, for example.

The computer system 402 may run on a variety of computing devices, such as a server, a Windows server, a Structure Query Language server, a Unix Server, a personal computer, a laptop computer, and so forth. In other implementations, the computer system 402 may run on a cluster computer system, a mainframe computer system and/or other computing system suitable for controlling and/or communicating with large databases, performing high volume transaction processing, and generating reports from large databases. The computing system 402 is generally controlled and coordinated by an operating system software, such as z/OS, Windows, Linux, UNIX, BSD, SunOS, Solaris, MacOS, or other compatible operating systems, including proprietary operating systems. Operating systems control and schedule computer processes for execution, perform memory management, provide file system, networking, and I/O services, and provide a user interface, such as a GUI, among other things.

The computer system 402 illustrated in FIG. 4 is coupled to a network 418, such as a LAN, WAN, or the Internet via a communication link 416 (wired, wireless, or a combination thereof). Network 418 communicates with various computing devices and/or other electronic devices. Network 418 is communicating with one or more computing systems 420 and one or more data sources 422. The module 414 may access or may be accessed by computing systems 420 and/or data sources 422 through a web-enabled user access point. Connections may be a direct physical connection, a virtual connection, or other connection type. The web-enabled user access point may comprise a browser module that uses text, graphics, audio, video, and other media to present data and to allow interaction with data via the network 418.

Access to the module 414 of the computer system 402 by computing systems 420 and/or by data sources 422 may be through a web-enabled user access point such as the computing systems' 420 or data source's 422 personal computer, cellular phone, smartphone, laptop, tablet computer, e-reader device, audio player, or another device capable of connecting to the network 418. Such a device may have a browser module that is implemented as a module that uses text, graphics, audio, video, and other media to present data and to allow interaction with data via the network 418.

The output module may be implemented as a combination of an all-points addressable display such as a cathode ray tube (CRT), a liquid crystal display (LCD), a plasma display, or other types and/or combinations of displays. The output module may be implemented to communicate with input devices 412 and they also include software with the appropriate interfaces which allow a user to access data through the use of stylized screen elements, such as menus, windows, dialogue boxes, tool bars, and controls (for example, radio buttons, check boxes, sliding scales, and so forth). Furthermore, the output module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition, a touch screen may act as a hybrid input/output device. In another embodiment, a user may interact with the system more directly such as through a system terminal connected to the score generator without communications over the Internet, a WAN, or LAN, or similar network.

In some implementations, the system 402 may comprise a physical or logical connection established between a remote microprocessor and a mainframe host computer for the express purpose of uploading, downloading, or viewing interactive data and databases on-line in real time. The remote microprocessor may be operated by an entity operating the computer system 402, including the client server systems or the main server system, an/or may be operated by one or more of the data sources 422 and/or one or more of the computing systems 420. In some implementations, terminal emulation software may be used on the microprocessor for participating in the micro-mainframe link.

In some implementations, computing systems 420 that are internal to an entity operating the computer system 402 may access the module 414 internally as an application or process run by the CPU 406.

In some implementations, one or more features of the systems, methods, and devices described herein can utilize a URL and/or cookies, for example, for storing and/or transmitting data or user information. A Uniform Resource Locator (URL) can include a web address and/or a reference to a web resource that is stored on a database and/or a server. The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Domain Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can include data sent from a website and/or stored on a user's computer. This data can be stored by a user's web browser while the user is browsing. The cookies can include useful information for websites to remember prior browsing information, such as a shopping cart on an online store, clicking of buttons, login information, and/or records of web pages or network resources visited in the past. Cookies can also include information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

The computing system 402 may include one or more internal and/or external data sources (for example, data sources 422). In some implementations, one or more of the data repositories and the data sources described above may be implemented using a relational database, such as DB2, Sybase, Oracle, CodeBase, and Microsoft® SQL Server as well as other types of databases such as a flat-file database, an entity relationship database, and object-oriented database, and/or a record-based database.

The computer system 402 may also access one or more data sources 422. The data sources 422 may be stored in a database or data repository. The computer system 402 may access the one or more data sources 422 through a network 418 or may directly access the database or data repository through I/O devices and interfaces 412. The data repository storing the one or more data sources 422 may reside within the computer system 402.

ADDITIONAL IMPLEMENTATIONS

In the foregoing specification, the systems and processes have been described with reference to specific implementations thereof. It will, however, be evident that various modifications and changes may be made thereto without departing from the broader spirit and scope of the implementations disclosed herein. The specification and drawings are, accordingly, to be regarded in an illustrative rather than restrictive sense.

Indeed, although the systems and processes have been disclosed in the context of certain implementations and examples, it will be understood by those skilled in the art that the various implementations of the systems and processes extend beyond the specifically disclosed implementations to other alternative implementations and/or uses of the systems and processes and obvious modifications and equivalents thereof. In addition, while several variations of the implementations of the systems and processes have been shown and described in detail, other modifications, which are within the scope of this disclosure, will be readily apparent to those of skill in the art based upon this disclosure. It is also contemplated that various combinations or sub-combinations of the specific features and aspects of the implementations may be made and still fall within the scope of the disclosure. It should be understood that various features and aspects of the disclosed implementations can be combined with, or substituted for, one another in order to form varying modes of the implementations of the disclosed systems and processes. Any methods disclosed herein need not be performed in the order recited. Thus, it is intended that the scope of the systems and processes herein disclosed should not be limited by the particular implementations described above.

It will be appreciated that the systems and methods of the disclosure each have several innovative aspects, no single one of which is solely responsible or required for the desirable attributes disclosed herein. The various features and processes described above may be used independently of one another or may be combined in various ways. All possible combinations and sub-combinations are intended to fall within the scope of this disclosure.

Certain features that are described in this specification in the context of separate implementations also may be implemented in combination in a single embodiment. Conversely, various features that are described in the context of a single embodiment also may be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination. No single feature or group of features is necessary or indispensable to each and every embodiment.

It will also be appreciated that conditional language used herein, such as, among others, "can," "could," "might," "may," "for example," and the like, unless specifically stated otherwise, or otherwise understood within the context as used, is generally intended to convey that certain implementations include, while other implementations do not include, certain features, elements and/or steps. Thus, such conditional language is not generally intended to imply that features, elements and/or steps are in any way required for one or more implementations or that one or more implementations necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. In addition, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one or more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

Further, while the methods and devices described herein may be susceptible to various modifications and alternative forms, specific examples thereof have been shown in the drawings and are herein described in detail. It should be understood, however, that the implementations are not to be limited to the particular forms or methods disclosed, but, to the contrary, the implementations are to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or implementations set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (for example, as accurate as reasonably possible under the circumstances, or for example ±5%, ±10%, ±15%, etc.). For example, "about 3.5 mm" includes "3.5 mm." Phrases preceded by a term such as "substantially" include the recited phrase and should be interpreted based on the circumstances (for example, as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain implementations require at least one of X, at least one of Y, and at least one of Z to each be present. The headings provided herein, if any, are for convenience only and do not necessarily affect the scope or meaning of the devices and methods disclosed herein.

Accordingly, the claims are not intended to be limited to the implementations shown herein but are to be accorded the widest scope consistent with this disclosure, the principles and the novel features disclosed herein.

What is claimed is:

1. A system for atomic cross-chain swaps, the system comprising:

A swap platform configured as a decentralized finance (DeFi) platform for facilitating an atomic cross-chain swap request comprising a relayer service in communication with:

a first distributed blockchain network comprising a peer-to-peer (P2P) computer network of N nodes that maintain a first blockchain tracking a first token;

a second distributed blockchain network comprising a peer-to-peer (P2P) computer network of M nodes that maintain a second blockchain tracking a second token;

a plurality of resolvers for processing operations for executing the atomic cross-chain swap request;

a decentralized application operating on at least one user device; and at least one of a plurality of decentralized exchanges or a plurality of centralized exchanges;

at least one hardware processor; and at least one non-transitory memory storing instructions, which, when executed by the at least one hardware processor, cause the swap platform to:

receive, from the decentralized application operating on the at least one user device, the atomic cross-chain swap request comprising a request to exchange a first amount of the first token for a second amount of the second token;

receive, from the decentralized application operating on the at least one user device, an encrypted secret and a secret hash, wherein the encrypted secret comprises a cryptographically secure random value secured by the secret hash;

generate, by the swap platform, a smart contract comprising a token approval function configured to verify, via the decentralized application, user approval of the atomic cross-chain swap request;

broadcast, by the relayer service of the swap platform, the atomic cross-chain swap request to the plurality of resolvers;

receive, from a resolver of the plurality of resolvers, an indication of the resolver to process the atomic cross-chain swap request;

verify, by the relayer service, the first amount of the first token stored in a first escrow smart contract on the first distributed blockchain network and second amount of the second token stored in a second escrow smart contract on the second distributed blockchain network; and transmit, by the relayer service to the resolver, the encrypted secret and the secret hash.

2. The system of claim 1, wherein the atomic cross-chain swap request comprises at least one of the following request parameters: the first token, the amount of the first token, the second token, the amount of second token, a minimum amount of the second token, and a time threshold.

3. The system of claim 1, wherein the atomic cross-chain swap request comprises at least one of the following request parameters: swap rate and execution approach.

4. The system of claim 1, wherein the smart contract comprises a token approval function.

5. The system of claim 1, wherein the resolver comprises more than one resolver of the plurality of resolvers.

6. The system of claim 5, wherein the secret is separately encrypted for each of the more than one resolver.

7. The system of claim 1, wherein the secret comprises a plurality of secrets, each secret corresponding to one of each of the plurality of resolvers.

8. The system of claim 1, wherein the secret is generated using a cryptographic random number generator.

9. A computer-implemented method for atomic cross-chain swaps, the computer-implemented method comprising:

receiving, by a computing device from a decentralized application operating on at least one user device, an atomic cross-chain swap request comprising a request to exchange a first amount of a first token for a second amount of a second token, wherein the first token is tracked by a first blockchain maintained by a first distributed blockchain network comprising a peer-to-peer (P2P) computer network of N nodes, and wherein the second token is tracked by a second blockchain maintained by a second distributed blockchain network comprising a peer-to-peer (P2P) computer network of M nodes;

receiving, by the computing device from the decentralized application operating on the at least one user device, an encrypted secret and a secret hash, wherein the encrypted secret comprises a cryptographically secure random value secured by the secret hash;

generating, by the computing device, a smart contract comprising a token approval function configured to verify, via the decentralized application, user approval of the atomic cross-chain swap request;

broadcasting, by the computing device, the atomic cross-chain swap request to a plurality of resolvers for processing operations for executing the atomic cross-chain swap request;

receiving, by the computing device from a resolver of the plurality of resolvers, an indication of the resolver to process the atomic cross-chain swap request;

verifying, by the computing device, the first amount of the first token stored in a first escrow smart contract on the first distributed blockchain network a first location and second amount of the second token stored in a second escrow smart contract on the second distributed blockchain network; and transmitting, by the computing system to the resolver, the encrypted secret and the secret hash, wherein the computing system comprises a processor and a memory.

10. The method of claim 9, wherein the atomic cross-chain swap request comprises at least one of the following request parameters: the first token, the amount of the first token, the second token, the amount of second token, a minimum amount of the second token, and a time threshold.

11. The method of claim 9, wherein the atomic cross-chain swap request comprises at least one of the following request parameters: swap rate and execution approach.

12. The method of claim 9, wherein the smart contract comprises a token approval function.

13. The method of claim 9, wherein the resolver comprises more than one resolver of the plurality of resolvers.

14. The method of claim 13, wherein the secret is separately encrypted for each of the more than one resolver.

15. The method of claim 9, wherein the secret comprises a plurality of secrets, each secret corresponding to one of each of the plurality of resolvers.

16. The method of claim 9, wherein the secret is generated using a cryptographic random number generator.

17. A non-transitory computer readable medium having stored thereon instructions for causing a processing circuitry to execute a process, the process comprising:

receiving, from a decentralized application operating on at least one user device, an atomic cross-chain swap request comprising a request to exchange a first amount of a first token for a second amount of a second token, wherein the first token is tracked by a first blockchain maintained by a first distributed blockchain network comprising a peer-to-peer (P2P) computer network of N nodes, and wherein the second token is tracked by a second blockchain maintained by a second distributed blockchain network comprising a peer-to-peer (P2P) computer network of M nodes;

receiving, from the decentralized application operating on the at least one user device, an encrypted secret and a secret hash, wherein the encrypted secret comprises a cryptographically secure random value secured by the secret hash;

generating a smart contract comprising a token approval function configured to verify, via the decentralized application, user approval of the atomic cross-chain swap request;

broadcasting the atomic cross-chain swap request to a plurality of resolvers for processing operations for executing the atomic cross-chain swap request;

receiving, from a resolver of the plurality of resolvers, an indication of the resolver to process the atomic cross-chain swap request;

verifying the first amount of the first token stored in a first escrow smart contract on the first distributed blockchain network and second amount of the second token stored in a second escrow smart contract on the second distributed blockchain network; and transmitting, to the resolver, the encrypted secret and the secret hash.

18. The non-transitory computer readable medium of claim 17, wherein the atomic cross-chain swap request comprises at least one of the following request parameters: the first token, the amount of the first token, the second token, the amount of second token, a minimum amount of the second token, and a time threshold.

19. The non-transitory computer readable medium of claim 17, wherein the atomic cross-chain swap request comprises at least one of the following request parameters: swap rate and execution approach.

20. The non-transitory computer readable medium of claim 17, wherein the smart contract comprises a token approval function.

* * * * *